United States Patent
Allan et al.

(10) Patent No.: US 8,086,758 B1
(45) Date of Patent: Dec. 27, 2011

(54) SYSTEMS AND METHODS FOR INTERCONNECTING MEDIA APPLICATIONS AND SERVICES WITH CENTRALIZED SERVICES

(75) Inventors: Graham S. Allan, Glendale, CA (US); James C. Casabella, La Crescenta, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1119 days.

(21) Appl. No.: 11/563,667

(22) Filed: Nov. 27, 2006

(51) Int. Cl.
G06F 15/16 (2006.01)

(52) U.S. Cl. ........ 709/253; 709/231; 709/225; 709/227; 370/352; 370/466; 379/266.07

(58) Field of Classification Search .......... 709/231, 709/253, 225, 227; 379/266.07; 370/352, 370/466
See application file for complete search history.

(56) References Cited

U.S. PATENT DOCUMENTS

| | | | |
|---|---|---|---|
| 5,737,747 | A | 4/1998 | Vishlitzky et al. |
| 5,913,061 | A | 6/1999 | Gupta et al. |
| 6,230,205 | B1 | 5/2001 | Garrity |
| 6,338,078 | B1 | 1/2002 | Chang et al. |
| 7,383,308 | B1 | 6/2008 | Groves et al. |
| 7,720,918 | B1 * | 5/2010 | Martin et al. ............. 709/206 |
| 2003/0023695 | A1 | 1/2003 | Kobata et al. |
| 2004/0015366 | A1 * | 1/2004 | Wiseman et al. ............. 705/1 |
| 2004/0111476 | A1 | 6/2004 | Trossen et al. |
| 2004/0199578 | A1 | 10/2004 | Kapczynski et al. |
| 2005/0091663 | A1 * | 4/2005 | Bagsby ............. 719/315 |
| 2005/0266836 | A1 | 12/2005 | Shan |
| 2007/0044127 | A1 | 2/2007 | Vaysman et al. |
| 2007/0150480 | A1 | 6/2007 | Hwang et al. |
| 2007/0220092 | A1 * | 9/2007 | Heitzeberg et al. ........... 709/204 |
| 2008/0037747 | A1 | 2/2008 | Tucker at al. |
| 2008/0098457 | A1 | 4/2008 | Carter |
| 2010/0027417 | A1 | 2/2010 | Franceschini et al. |

OTHER PUBLICATIONS

Digital Asset Management at WBGH, downloaded from daminfo.wgbh.org/05113-DAM_Generic.pdf pp. 1-45.
Digital Asset Management at WBGH, pp. 1-8 downloaded from daminfo.wgbh.org/030321-DAM_Overview.pdf (date unknown).
Goel et al., Enterprise Integration EAI v. SOA v ESB pp. 1-6, Jun. 20, 2006.
Healey, "Sony is Building a Digital Library", pp. 1-4, Apr. 18, 2005.
Linthicum et al. "12 Steps to Implementing a Service Oriented Architecture" Grand Central Communications Oct. 1, 2004 pp. 1-7.

(Continued)

Primary Examiner — Wing Chan
Assistant Examiner — Hitesh Patel
(74) Attorney, Agent, or Firm — Kilpatrick Townsend & Stockton LLP

(57) ABSTRACT

Systems and methods are provided to integrate disparate media services and applications across an organization. The media services are connected to an interoperable media services bus by creating a connector API for each service, thereby enabling the media services to exchange messages in a standardized format related to transactions to be performed involving media assets and/or metadata associated with media assets. Also connected to the interoperable media services bus are one or more centralized services that can be used to improve uniformity of behavior across the media services. Examples of centralized services include searching of media asset metadata, management of access rights to media services and/or media assets, accounting functions related to use of the media services, transformations (such as encoding or digital-rights management wrapping) of media assets, and the like.

18 Claims, 16 Drawing Sheets

OTHER PUBLICATIONS

MacVittie, "Enterprise Information Integration Suites—Don't Fear the Data" Network Computing Sep. 6, 2004.

Slama, D. and Banke, K. and Krafzig, D.: Service Oriented Architecture: Inventory of Distributed Computing Concepts, Prentice Hall PTR, 2004, pp. 1-13.

Web Services Journal "Service-Oriented Architecture Best Practices" as downloaded from webservices.sys-con.com/read/48032_p.htm on Jun. 10, 2005.

Web Services Journal "Critical Decisions for Service-Oriented Architecture" as downloaded from webservices.sys-con.com/read/39681_p.htm on Jun. 10, 2005.

Digital Asset Management at WBGH, downloaded from http://daminfo.wgbh.org/05113-DAM_Generic.pdf Jan. 13, 2005, pp. 1-45.

Digital Asset Management at WBGH, downloaded from http://daminfo.wgbh.org/030321-DAM_Overview.pdf, Mar. 21, 2003, pp. 1-5.

Digital Asset Management at WBGH, downloaded from http://daminfo.wgbh.org/05113-DAM_Generic.pdf Jan. 13, 2005, pp. 1-45.

Digital Asset Management at WBGH, downloaded from http://daminfo.wgbh.org/030321-DAM_Overview.pdf, Mar. 21, 2003, pp. 1-5.

Digital Asset Management at WBGH downloaded from daminfo.wgbh.org/05113-DAM_Genetic.pdf pp. 1-45 Jan. 13, 2005.

Digital Asset Management at WBGH, pp. 1-8 downloaded from //daminfo.wgbh.org/030321-DAM_Overview.pdf Mar. 21, 2003.

Goel et al., Enterprise Integration EAI v. SOA v ESB pp. 1-6, Jun. 20, 2006.

Healey, "Sony is Building a Digital Library", pp. 1-4, Apr. 18, 2005.

Lithicum et al. "12 Steps to Implementing a Service Oriented Architecture" Grand Central Communications Oct. 1, 2004 pp. 1-7.

MacVittie, "Enterprise Information Integration Suites—Don't Fear the Data" Network Computing Sep. 6, 2004.

Slama, D. and Banke, K. and Krafzig, D.: Service Oriented Architecture: Inventory of Distrubuted Computing Concepts, Prentice Hall PTR, 2004, pp. 1-13.

Web Services Journal "Service-Oriented Architecture Best Practices" as downloaded from //webservices.sys-con.com/read/48032_p.htm on Jun. 10, 2005.

Web Services journal "Critical Decisions for Service-Oriented Architecture"as downloaded from //webservices.sys-con./read/39681_p.htm on Jun. 10, 2005.

\* cited by examiner

| 200 → | CONNECTOR CLASSES | | | | |
|---|---|---|---|---|---|
| 202 ↓ | T-code | Editor | HSM | Storage | DAM |
| SearchAssetMetadata |  |  | ✓ | ✓ | ✓ |
| BrowseAssets |  |  | ✓ | ✓ | ✓ |
| VerifyAssetPresence |  |  | ✓ | ✓ | ✓ |
| SendAssetMetadata |  |  | ✓ | ✓ | ✓ |
| ViewAsset |  |  |  |  | ✓ |
| SendAsset |  |  | ✓ | ✓ | ✓ |
| AddAsset |  |  | ✓ | ✓ | ✓ |
| CheckoutAsset |  |  |  |  | ✓ |
| UpdateAsset |  |  | ✓ | ✓ | ✓ |
| RemoveAsset |  |  | ✓ | ✓ | ✓ |
| ArchiveAsset |  |  | ✓ |  | ✓ |
| UpdateAssetMetadata |  |  | ✓ | ✓ | ✓ |
| SendTemplates | ✓ | ✓ |  |  |  |
| SendFormats | ✓ | ✓ |  |  |  |
| SubmitJob | ✓ | ✓ |  |  |  |
| UpdateJob | ✓ | ✓ |  |  |  |
| CancelJob | ✓ | ✓ |  |  |  |
| SendStatus | ✓ | ✓ | ✓ | ✓ | ✓ |
| ReceiveNotification | ✓ | ✓ | ✓ | ✓ | ✓ |

210: SearchAssetMetadata, BrowseAssets, VerifyAssetPresence, SendAssetMetadata
220: ViewAsset, SendAsset, AddAsset, CheckoutAsset, UpdateAsset, RemoveAsset, ArchiveAsset, UpdateAssetMetadata
230: SendTemplates, SendFormats, SubmitJob, UpdateJob, CancelJob
240: SendStatus, ReceiveNotification

FIG. 2

SYSTEMS AND METHODS FOR INTERCONNECTING MEDIA APPLICATIONS AND SERVICES WITH CENTRALIZED SERVICES

CROSS-REFERENCES TO RELATED APPLICATIONS

The present disclosure is related to the following commonly-assigned co-pending U.S. Patent Applications: application Ser. No. 11/563,666, filed of even date herewith, entitled "Systems and Methods for Interconnecting Media Applications and Services"; application Ser. No. 11/563,669, filed of even date herewith, entitled "Systems and Methods for Interconnecting Media Services to an Interface for Transport of Media Assets"; and application Ser. No. 11/563,670, filed of even date herewith, entitled "Systems and Methods for Interconnecting Media Applications and Services with Automated Workflow Orchestration."

BACKGROUND OF THE INVENTION

The present invention relates in general to enterprise-wide data management and in particular to a service-oriented architecture adapted to handle media assets, services and other media-related applications.

A "media asset" as used herein refers generally to any form of media content, including video, audio, still images and the like. Media assets can exist in digital (e.g., MPEG-4 or raw video) and/or analog (e.g., film) forms. Organizations that create and distribute media content typically generate numerous media assets that must be managed. For instance, the organization needs to track assets in various forms and formats, generally distributed across a range of storage locations and systems. The organization also needs to regulate access to the various assets so that people or business units within the organization that need an asset (or information about an asset) can obtain what they need while unauthorized uses are prohibited.

In an effort to meet these needs, numerous computer-based media management services and systems have been developed. These services and systems use a variety of protocols and interfaces to support asset management functions such as creation, distribution, updating, storage and retrieval of media assets. The protocols and interfaces vary greatly depending, e.g., on the type of asset being managed and the particular needs of a business unit or organization that implements a given service or system. Allowing business units to select or develop their own media services and systems provides tremendous flexibility to an organization, as each business unit can adopt a solution that meets its particular requirements.

Integrating these solutions across disparate business units, however, has proven difficult. Often, the various services and systems are proprietary and cannot be easily modified to intercommunicate with other vendors' products. Different services and systems may also support different and potentially incompatible protocols for performing asset management functions such as locating and/or transferring assets.

One solution that has been tried is to create point-to-point connections between pairs of media asset management services or systems on an as-needed basis. For instance, when two business units determine that they would benefit from sharing access to media assets and/or metadata about their respective media assets, these business units can contract with a developer to create an interface that will enable the two services or systems to communicate. Creation of custom interfaces is generally a slow process, as the developer must design and test the interface for the specific services or systems being connected; six-month set-up cycles are typical. Such interfaces are also fragile, in that modifications to either service or system may break the communication path until such time as modifications to the interface are made. In some cases, business requirements may change so rapidly that the developers of point-to-point interfaces simply cannot keep up.

Further, creating and maintaining a point-to-point connection can be a major expense. The expense multiplies as the number of services and systems to be integrated increases, making the point-to-point solution cost prohibitive for large organizations. Thus, point-to-point solutions are not scalable to large media enterprises with many business units and disparate media services and systems.

Another solution is to create a monolithic structure that supports intercommunication between a number of "preferred" media asset management services or systems. As long as every business unit in the organization is amenable to using one of the preferred services and systems, this solution is workable. However, as with the point-to-point approach, the cost of implementing this approach scales with the number of different services or systems on the "preferred" list. Thus, as a practical matter, it is usually necessary to limit the number of preferred systems. Business units may then face a difficult choice between a system that meets their needs but is not a preferred system and a preferred system that is a poor fit to their needs.

It would therefore be desirable to provide a more flexible, scalable solution to the problems of creating, distributing, updating, storing and retrieving media assets across a large organization.

BRIEF SUMMARY OF THE INVENTION

Embodiments of the present invention provide systems and methods capable of integrating media services and applications across an entire organization with multiple disparate business units. The media applications and services (referred to herein as "media services") may be of disparate types, including but not limited to storage managers, digital asset managers, encoders, decoders, transcoders, media editors, media creators, rights managers, accounting systems, and the like. Each media service may be implemented using any suitable computer software and/or hardware components; some services may be implemented using proprietary software. The media services are connected to an interoperable media services bus by creating a connector API for each service, thereby enabling the media services to exchange messages related to creation of an asset; distribution or transfer of an asset; updating of an asset; removal of an asset; locating an asset; determining or updating ownership and/or provenance of an asset; and any other aspect of media asset management. Some embodiments also provide one or more centralized services; such services can be used to improve uniformity of behavior across the media services.

Examples of centralized services include a global search service for searching metadata associated with media assets across all connected media services; a nomenclature service that defines and enforces standard nomenclature across connected media services, a mapping service that defines a standardized (canonical) metadata schema and facilitates mapping between the canonical schema and various local schemas used by different media services; a registry of authorized users and/or automated processes and their rights with respect to each media service; a rights management service that controls access to assets and metadata maintained by any of the media services; an accounting service that tracks charges incurred during use of the interoperable media services bus or the media services; and so on. Other examples include services that perform various operations on media assets maintained by the media services, such as rendering, editing, encoding, transcoding, applying digital rights management (DRM) wrappers and watermarks, and the like.

According to one aspect of the invention, a system includes a number of "local" computer systems, each of which is adapted to operate a respective media service. Each media service has a connector associated therewith, and the connector is adapted to translate messages between a local protocol specific to the media service and a common protocol. The system also includes at least one centralized computer system adapted to operate at least one centralized service and to send and receive messages related to the centralized service using the common protocol. An interoperable media services bus is communicably coupled to each of the connectors and to the centralized service(s). The interoperable media services bus is adapted to support an exchange of messages between the media services and the centralized service according to the common protocol and is further adapted to route a request message related to the centralized service from any one of the media services to the centralized service for processing.

According to another aspect of the present invention, a method for interoperating disparate media services is provided. For each one of the media services, an application program interface (API) is defined. The API translates messages between a local format recognized by the media service and a standard format recognized by an interoperable media services bus. For at least a first centralized service, an interface is defined to receive request messages from the interoperable media services bus and to return response messages to the interoperable media services bus. A first request message is sent from a requesting one of the media services to the interoperable media services bus; the first request message requests a service that is performable by the first centralized service and can be sent by using the API of the requesting media service to translate the request message from the local format recognized by the requesting media service to the standard format. The first request message is routed to the first centralized service; this routing can be performed by the interoperable media services bus transparently to the requesting media service. The first centralized service is operated to perform the requested service and to generate a first response message responsive to the first request message. The first response message is sent to the interoperable media services bus, which routes the first response message to the requesting media service.

The following detailed description together with the accompanying drawings will provide a better understanding of the nature and advantages of the present invention.

BRIEF DESCRIPTION OF THE DRAWINGS

FIG. 2 is a table listing some of the messages supported in connector classes for an IMS system according to an embodiment of the present invention.

DETAILED DESCRIPTION OF THE INVENTION

1. Overview

Figure 1:
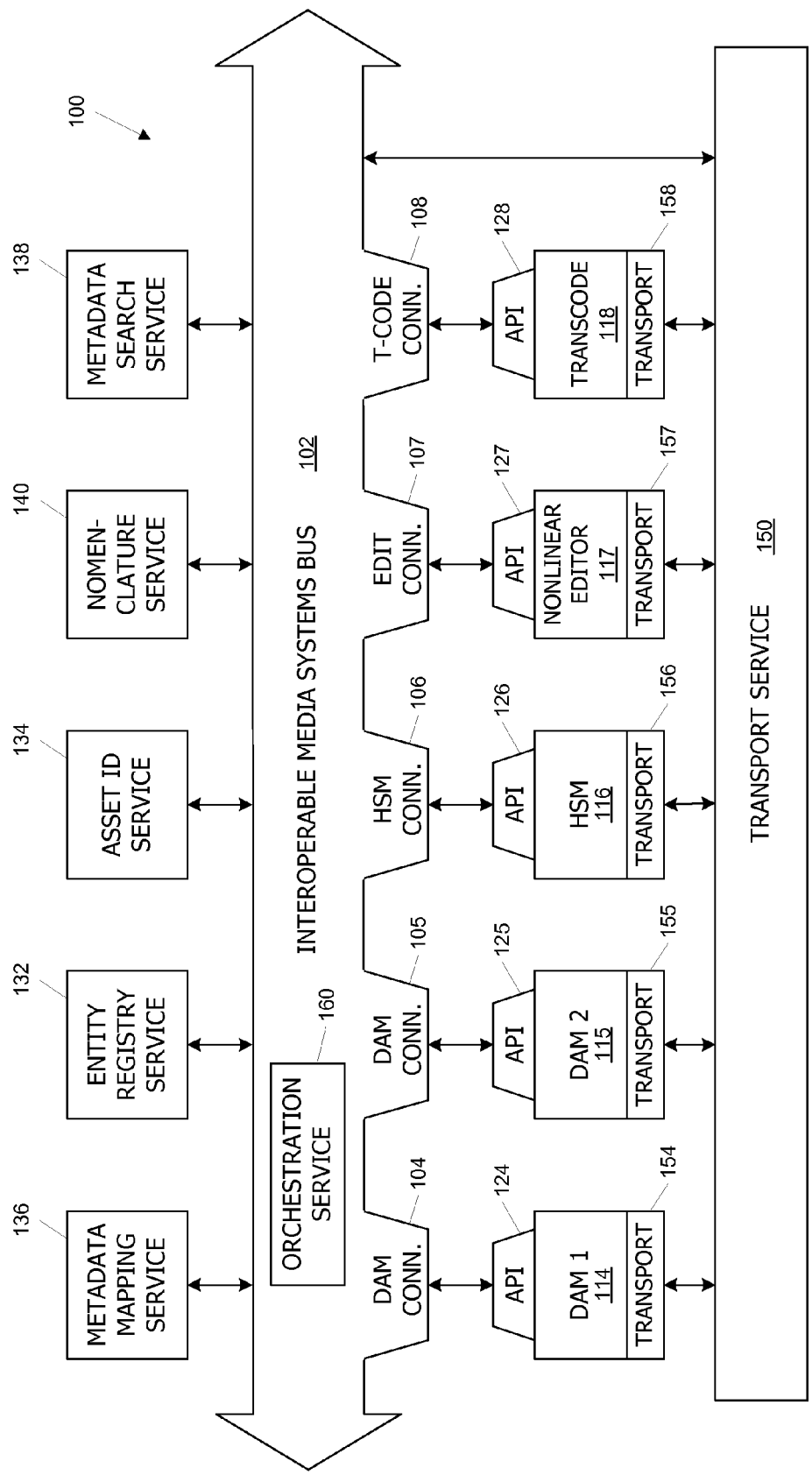
FIG. 1 is a block diagram of an interoperable media services (IMS) system according to an embodiment of the present invention.

Embodiments of the present invention provide service-oriented architectures (SOAs) capable of integrating media services and applications across an entire organization with multiple disparate business units. (As used herein, "business units" can include departments, divisions, subsidiaries, affiliates, and the like.) In some embodiments, the SOA is based on an Enterprise Services Bus model (ESB) with additional enhancements specific to media assets, applications and services to support integration across disparate systems.

One embodiment of the present invention, referred to herein as an "interoperable media services" (or "IMS") system, is capable of interconnecting any number of media applications and services. The media applications and services (referred to herein as "media services") may be of disparate types, including but not limited to storage managers, digital asset managers, encoders, decoders, transcoders, media editors, media creators, rights managers, accounting systems, and the like. Each media service may be implemented using any suitable computer software and/or hardware components; some services may be implemented using proprietary software. The IMS system provides definitions for a number of service classes (e.g., DAM class, transcoder class, storage class, editor class, etc.) and, for each class, a standardized interface, referred to herein as a "connector." Any service can be connected into the IMS system by creating an API that implements the standardized connector functionality for at least one connector class. Using the IMS system, the various services can exchange messages related to any aspect of the management of media assets, including but not limited to creation of an asset; distribution or transfer of an asset; updating of an asset; removal of an asset; locating an asset; determining or updating ownership and/or provenance of an asset; and so on.

The media assets managed by the system can exist in analog and/or digital form. For digital assets, some embodiments of the invention provide a transport service that allows services connected to the IMS system to transfer assets from one service to another in a manner that is blind to transport protocols. The transport service advantageously provides security measures to prevent unauthorized parties from gaining access to media assets during transport. As described below, the large size of many media assets and the security considerations associated with media files require a specialized solution.

1.1. Underlying Technologies

In some aspects, the IMS system embodiments described herein build on well-known concepts in information technology, in particular an Enterprise Service Bus (ESB) that implements a service oriented architecture (SOA). To facilitate understanding of the present invention, a brief discussion of these underlying technologies is provided.

In an SOA, various resources (such as computer programs, databases, and/or computational resources) can be made available as "services" accessible to "clients" (e.g., end users or automated processes, which may include other applications or services). The services can be hosted by various computers connected via a network, which may be a local area network (LAN), wide area network (WAN), Internet, or the like. A protocol is provided that allows clients to access the resources without knowledge of the underlying implementation details. Thus, for instance, a client can use the protocol to communicate with a database without knowing what database software is actually used to build and maintain the database, what information schema is used by the database, or in some cases, which computer on the network is host to the database.

An ESB is an architectural pattern that can be used to implement an SOA. An ESB supports virtualization and management of service interactions between communicating participants (e.g., a client making a request on a first computer system and a service hosted on a second computer system that responds to the request). The ESB pattern makes the implementation details of a service endpoint transparent to the client; the client simply sends a request as a message to the ESB and receives a response. Transparently to the client, the ESB identifies a service capable of handling the request, delivers the message to that service, and obtains a response from the service, which the ESB routes back to the requesting client. The request messages and responses can be expressed in XML or a similar language and handled according to a protocol supported by a particular ESB implementation (e.g., conventional protocols such as SOAP/HTTP, SOAP/JMS or the like).

To make communication details transparent, the ESB performs a number of mediation functions.

One mediation function is routing. The ESB can determine a path for a message based on content or context of the message or other criteria reflective of the requester's intent. Thus, the client that makes a request is not required to specify routing information (in some instances, not even a destination) for a request.

A second mediation function is protocol conversion. The ESB can modify an interaction protocol to suit the requirements of a service provider. This frees the client from needing to know details of the service provider's protocol requirements for inbound messages.

A third mediation function is message transformation. The ESB can envelope or de-envelope a message payload, e.g., to encrypt or decrypt a message or to map one schema to another.

A fourth mediation function is event correlation. The ESB can extract event information from messages exchanged between participating services and use this information to recognize aggregate events based on patterns or sequences of reported events.

An ESB thus supports a number of message exchange scenarios that may be useful for media services integration. For instance, interested parties (including systems, services, and/or individual users) might join a distribution list to receive notification of a particular event (which may be a single event or an aggregate event). The ESB can maintain the distribution list, detect the event, and send the appropriate notifications when the event occurs. The ESB can also perform "matchmaking" services, e.g., by identifying compatible partners for a particular interaction on a dynamic basis. The ESB can also aggregate multiple requests into a single message or disaggregate a request into multiple messages. It is to be understood that other message exchange scenarios are also possible.

Conventional ESBs, however, fall short of what is needed for integrated media asset management services in several ways. For example, conventional ESBs generally assume synchronous communication; that is, one connected service (a sender) sends a message and waits to receive a response from another connected service (the recipient) before proceeding further. This message/response model is unsuited for transactions involving media assets. For instance, a secure transfer of a media asset (e.g., a 100-GB raw video file) from one service to another may take hours or days. As another example, existing ESBs generally have limited capability to coordinate execution of disparate services across multiple providers into a seamless operation, particularly where synchronous and asynchronous transactions are to be coordinated with each other.

1.2. IMS Bus Overview

In accordance with some embodiments of the present invention, an ESB architecture is augmented with media-specific enhancements to provide a system capable of interconnecting media services for interoperability across a large organization.

FIG. 1 is a block diagram of an IMS system 100 according to an embodiment of the present invention. IMS system 100 includes an IMS bus 102, which may be implemented, e.g., using software running on a server or on a farm or network of interconnected cooperating servers. Conventional server technologies may be used. In some embodiments, IMS bus 102 is implemented as an ESB with media-specific enhancements that will be described below. Features of IMS bus 102 not described further herein can be implemented using conventional technologies, as will be apparent to those of ordinary skill in the art with access to the present teachings.

IMS bus 102 provides a number of connectors 104-108 allowing services 114-118 to connect to IMS bus 102. Each service 114-118 may be implemented in software executing on a suitably configured computer system, and multiple services could be implemented on a single computer system. Each service 114-118 has a respective API 124-128 that translates between the IMS bus messages defined by the respective one of connectors 104-108 and the native message format (e.g., a command language) of the service 114-118. Connectors and APIs are described below.

Some of services 114-118 may include a user interface, allowing users logged on to the computer system hosting the service to use the service directly and/or to access indirectly (and transparently to the user) other services via IMS bus 102. Services 114-118 may also include an internal application interface allowing applications or other automated processes to access the service and/or to access other services via IMS bus 102. Such internal application and/or user interfaces may be proprietary in nature. IMS bus 102 and services 114-118 may be implemented on numerous computer systems that are communicably coupled via a network, which may be, e.g., a private network, a LAN or WAN, the Internet, a Virtual Private Network (VPN), or the like.

In addition to distributed services 114-118, IMS system 100 also provides a number of centralized services, including an entity registry service 132, an asset identification (ID) service 134, a metadata mapping service 136, a global metadata search service 138, and a nomenclature service 140. In some instances, a centralized service provides more efficient access to information that might also exist in distributed form across services 114-118; in other instances, a centralized service maintains information that, by its nature, could not be maintained in distributed form (e.g., where uniformity across the entire organization is desired).

IMS system 100 also includes a transport service 150, which communicates with respective transport interfaces 154-158 of connected services 114-118. Transport service 150, as described below, manages the transfer of digital media assets between services 114-118. Transport service 150 is connected to but distinct from IMS bus 102 and is optimized for secure, asynchronous data transfer between disparate systems.

2. Media Asset Management Services and Connectors

In FIG. 1, media applications and services are represented by media services 114-118, which correspond to media applications and services of disparate types. For example, services 114 and 115 are digital asset management (DAM) services that catalog media assets to facilitate retrieval, updating, and/or removal thereof. A DAM service may also store assets locally, or it may simply track where the assets are stored remotely. It should be noted that services 114 and 115 might differ, e.g., in the nature and/or particular list of assets managed, the computer software used to manage the assets, the presence or absence of locally stored assets, and so on. In one embodiment, DAM services 114 and 115 are under control of two different business units within an organization, such as two different TV networks, a movie studio and a record company, or any other combination of business units.

DAM services 114 and 115 advantageously maintain their catalogs of media assets in respective databases (not explicitly shown). These databases include metadata describing each media asset. The metadata may include any information about the asset, including but not limited to a title, asset type (e.g., movie, movie clip, still image, audio, etc.), asset format, date of creation, names of persons appearing and/or characters depicted in the asset, length and/or file size, location where the asset is stored, ownership and/or provenance of the asset, alternative versions of the asset (e.g., thumbnails or low bit-rate proxy versions), and so on. In some embodiments the metadata may include a "local" asset identifier assigned by the DAM service and/or a "global" asset identifier that may be assigned by the centralized asset ID service 134 as described below. It is to be understood that the particular metadata and metadata schema (e.g., field names and arrangement of metadata) can be different between DAM services 114 and 115.

DAM services 114 and 115 advantageously provide user interfaces and/or application interfaces allowing authorized clients (including users and/or automated processes such as application programs) to search and/or browse their respective databases to locate media assets, to update the metadata, and—if assets are stored locally—to transfer assets to or from the local storage. These interfaces may be proprietary to the respective creators of DAM services 114 and 115, and they may be mutually incompatible.

Service 116 is a hierarchical storage management (HSM) service that stores and retrieves media assets. HSM service 116 is advantageously implemented on a computer system that includes both fast-access (e.g., disk) and archival (e.g., robotic tape vault) storage media. In one embodiment, HSM service 116 can store an asset on disk, archive the asset to tape, and retrieve assets from disk or tape.

Like DAM services 114 and 115, HSM service 116 also advantageously maintains a database cataloging the assets stored therein. Any metadata may be included in the database, and the metadata and/or metadata schema employed by HSM service 116 might or might not conform to those employed by DAM services 114 and/or 115. HSM service 116 also provides a user interface and/or an application interface allowing authorized clients to search and/or browse its database to locate media assets, to update the metadata, and to transfer assets to or from the local storage media. In addition, clients can also instruct HSM service 116 to archive an asset (e.g., by transferring the asset from disk to tape) or retrieve an archived asset (e.g., by transferring the asset from tape to disk). Other storage management services may also be connected to IMS bus 102, including, e.g., non-hierarchical (e.g., disk-only or tape-only) storage management services.

Editing service 117 provides a media asset creation/editing service. Service 117 advantageously provides a user interface via which users can create or modify media assets. For example, in the case of video or audio assets, users can extract clips from media assets, splice clips (or entire assets) together, create transitions between clips, or the like. Users may also be able to perform image editing operations or the like. In some embodiments, service 117 does not provide long-term storage or cataloging of media assets, although assets to be edited can be temporarily resident there.

Transcoding service 118 provides a media asset transcoding service. As used herein, "transcoding" is a general term for converting a digital media file from one format to another. For instance, native digital data may be transcoded to MPEG-4, or an MPEG-4 file may be transcoded from one resolution to another (e.g., from a resolution suited for high-definition TV broadcasts to a format suited for streaming via the World Wide Web). It is to be understood that transcoding service 118 may support any combination of file formats and transcoding operations. Like editing service 117, transcoding service 118 in some embodiments does not provide long-term storage or cataloging of media assets, although assets that are actively being transcoded (or are queued for transcoding) can be temporarily resident there.

It is to be understood that the particular media applications and services described herein are merely examples and that any number and type of media applications and services may be connected to IMS bus 102. As used herein, "media services" may include any service or application that participates in creation, distribution, updating, editing, storing and retrieval, tracking, rights management, and/or any other aspect of managing a media asset at any point in the asset's lifecycle. For example, a business unit might maintain a database of media assets that exist in physical form (e.g., films, videotapes, etc.); such a database can be connected as a service to IMS bus 102 even though the assets themselves cannot be transported electronically. Media creation services (e.g., rendering programs or the like) may also be connected. Further, some services may provide redundant or overlapping functionality. For instance, any number of transcoders supporting any number and combination of formats may be connected, and it may be that multiple connected transcoders are capable of performing a particular transcoding operation. In some embodiments, connected services are virtualized. That is, a client can send a request to IMS bus 102 identifying a service to be performed without specifying a service provider; IMS bus 102 automatically selects an appropriate service provider and routes the request appropriately.

Connectors 104-108, defined by IMS bus 102, allow disparate media services such as services 114-118 to be interconnected via IMS bus 102. IMS bus 102 advantageously defines a number of different connector classes corresponding to the number of different types of services that it is desired to interconnect. A connector class may be specific to a particular type of media service (e.g., DAM, HSM, editing and transcoding services may belong to different classes) but is advantageously not specific to a particular implementation of a media service. Thus, it is to be understood that in FIG. 1, DAM connectors 104 and 105 are advantageously identical, even if DAM services 114 and 115 are different. HSM connector 106 is specific to hierarchical storage management services, while edit connector 107 is specific to editing services and T-code connector 108 is specific to transcoding services.

A connector class specifies the functions that a service belonging to that class is expected to execute. For instance, the connector class may specify a format for each message that can be sent via IMS bus 102 to a service to request that the service perform one of its functions; for each message that can be sent, the class may also specify a corresponding response message (if any) that the service is expected to return upon performing the requested function. In one embodiment, messages are implemented as XML documents that can be sent using conventional protocols such as SOAP/HTTP or the like.

Each request message advantageously includes a function name that uniquely identifies the function being requested, a list of parameters applicable to the function, protocol bindings, and any other information that needs to be provided. It should be noted that, to the extent possible, where the same function is included in multiple connector classes, the messages invoking that function in each connector class are advantageously the same. Thus, it is possible to create a master list of potentially available functions and define connector classes based on which subset of the master list is supported.

To illustrate connector classes, FIG. 2 is a table 200 listing some of the messages supported according to an embodiment of the present invention and indicating which of various connector classes support each message. Column 202 lists messages (by function name) and can be viewed as a portion of a master list of functions. The remaining columns 204 correspond to different connector classes that might be defined: "T-code" is a transcoder class, "Editor" is an editor class, "HSM" is a hierarchical storage manager class; "Storage" is a non-hierarchical storage manager class, and "DAM" is a digital asset manager class. It is to be understood that the number and combination of supported classes may vary from that shown. A check mark indicates that a particular function is supported by a particular connector classes.

A first group of functions 210 includes functions applicable to services that maintain asset databases, such as HSM service 116 and DAM services 114 and 115 of FIG. 1. "SearchAssetMetadata" provides an interface via which a client (e.g., a consumer) can query the database. In some embodiments, IMS bus 102 can use metadata mapping service 136 to translate a query into the appropriate schema for the service, as described below. The response to a SearchAssetMetadata request advantageously includes a listing of results of the query. "BrowseAssets" allows a client to request a list of assets managed or stored by the service; the service responds by returning some or all of the metadata for each asset in the database. "VerifyAssetPresence" allows a client to query whether a particular asset is or is not stored by the service; the service returns a yes/no response. "SendAssetMetadata" allows a requester to obtain all of the metadata for an asset specified in the message; the service returns all of the metadata for the specified asset.

A second group of functions 220 includes functions applicable to services that store assets, such as HSM service 116, a non-hierarchical storage service (not explicitly shown in FIG. 1), and DAM services 114 and 115. "ViewAsset" allows a client to request a streamed transmission of the asset; in this example, only the non-hierarchical storage service supports this function. The response includes streaming the asset to the requester; the streaming may be performed using transport service 150 described below. "SendAsset" allows a client to request the asset. The response maybe a message indicating whether the request will or will not be granted. If the request is granted, the asset is advantageously sent using transport service 150 as described below. "AddAsset" allows a client to request that an asset be added to the service's store. The asset to be added is advantageously delivered to the service using transport service 150 as described below prior to sending the "AddAsset" message. "CheckoutAsset," available via DAM services 114 and 115, allows a requester to temporarily "lock" an asset that is to be updated to prevent others from performing conflicting updates. The response is a message indicating whether the asset was successfully locked.

"Update asset" allows a client to provide an updated version of an existing asset to the service. In some embodiments, the updated asset is advantageously added as a new version (rather than replacing the existing asset), and the response may be a confirmation of the update. "RemoveAsset" allows a client to instruct the service to remove an asset from its database (and data store if applicable). The service responds with a confirmation of the removal. "ArchiveAsset," supported by HSM service 116, allows a client to instruct the service to transfer an asset to archival storage (e.g., robotic tape vault). Again, the response may be a confirmation that the transfer has been (or will be) performed. "UpdateAssetMetadata" allows a client to request that the service update the metadata for a particular asset; again, the service may respond with a confirmation.

A third group of functions 230 includes functions applicable to media asset modification services such as transcoder service 118 or editor service 117 of FIG. 1. "SendTemplates" allows a client to request a list of job templates supported by the service. A job template, as used herein, is a set of predefined parameters that simplifies the setup of an editing or transcoding request. For example, a job template for a transcoding operation might specify an input format, output format, and any particular parameters pertaining to the conversion (e.g., output resolution, frame rate or the like). A job template for an editing process might specify, e.g., a transition progression for dissolving from one clip to another, or the like. In response to a "SendTemplates" request, the service returns a list of all job templates defined thereon. "SendFormats" allows a client to request a list of media file formats supported by the service. In the case of a transcoder service, the list may include input formats, output formats, and/or supported conversions between particular formats.

"SubmitJob" allows a client to submit a job to the service for processing. This message advantageously identifies the asset (e.g., a file) to be processed and the type of processing to be done. The type of processing may be specified by a job template or by supplying an applicable set of parameters. (In some cases, some or all parameters may have default values, so that the message need only specify values for parameters to the extent needed to override defaults). The asset to be processed is advantageously delivered to the service via transport service 150 prior to the SubmitJob message. In response to the SubmitJob message, the service queues the job and notifies the client. "UpdateJob" allows a client to update some or all parameters for a job. In some embodiments, the ability to update parameters may be limited to jobs that are still pending in the queue; once a job has started, its parameters cannot be updated. "CancelJob" allows a client to cancel a job that is pending or in progress. Upon cancellation, the asset may be returned to its source or held for a time in case the client submits a new job pertaining to the same asset.

A fourth group of functions 240 includes general functions that are desired in all connected services to support asynchronous transactions. The "SendStatus" message allows a client to request status information related to a long-running (asynchronous) transaction that the service is processing. For example, a client may use "SendStatus" to query a transcoder service as to the status of a requested transcoding operation. "ReceiveNotification" is a generic message that any service may receive or send. In one embodiment, a service sends "ReceiveNotification" to notify another service (which might or might not be the requesting client) that an asynchronous transaction has completed.

Message exchange is advantageously synchronous: a client sends a request message and waits for a response. Accordingly, if a request fails, the service advantageously returns an error message indicating the nature of the failure. For instance, the error message might indicate that an asset or its metadata was not found, or that the client (which may be a user or automated process) does not have sufficient rights to receive the requested information or asset. Further, the responses are advantageously defined such that the sender of a message should not expect to wait long for a response.

It is contemplated that execution of functions, unlike message exchange, may be asynchronous. For instance, as described below, transfer of a media asset from a source service to a destination service may not be completed for hours or days after the source service receives a "SendAsset" request. Accordingly, the message response to a SendAsset request advantageously indicates whether the source will or will not send the asset but does not include the asset. Once the transfer is complete, the source service advantageously sends a ReceiveNotification message to alert interested parties (e.g., the destination service) that the transfer is complete. Similarly, editing, transcoding, and other functions involving manipulation and/or transfer of media assets may advantageously be asynchronous.

It will be appreciated that the foregoing list of functions is illustrative and that variations and modifications are possible. More functions, fewer functions, and different combinations of functions may be supported. Any number of connector classes supporting any combination of functions may be defined. In some embodiments, each service publishes its list of supported messages, e.g., using the well-known Web Services Description Language (WSDL). IMS bus 102 reads the WSDL information to determine how to communicate with the service and to assign the service to a connector class based on the combination of functions it supports. IMS bus 102 can also use WSDL information to mediate between different services, as is known in the art.

In some embodiments, IMS bus 102 maintains a centralized registry (not explicitly shown in FIG. 1) of all connected services (e.g., a UDDI registry). This registry, which can be populated using the WSDL information published by each connected service, provides IMS bus 102 with information as to the functions available in each connected services and how to activate those functions. Automated multi-step workflows (described below with reference to orchestration service 160) can also be included in this centralized registry. IMS bus 102 can use the centralized registry to determine how to route any request from any client.

To connect a service to IMS bus 102, a connector API specific to that service and conforming to the appropriate connector class is defined. The connector API converts messages received from IMS bus 102 conforming to the connector class into commands (e.g., function calls) that can be understood and acted on by the connected service. For example, in accordance with the embodiment of FIG. 2, connector API 124 for DAM service 114 would include the functions in groups 210, 220 and 240 but not group 230.

Figure 3:
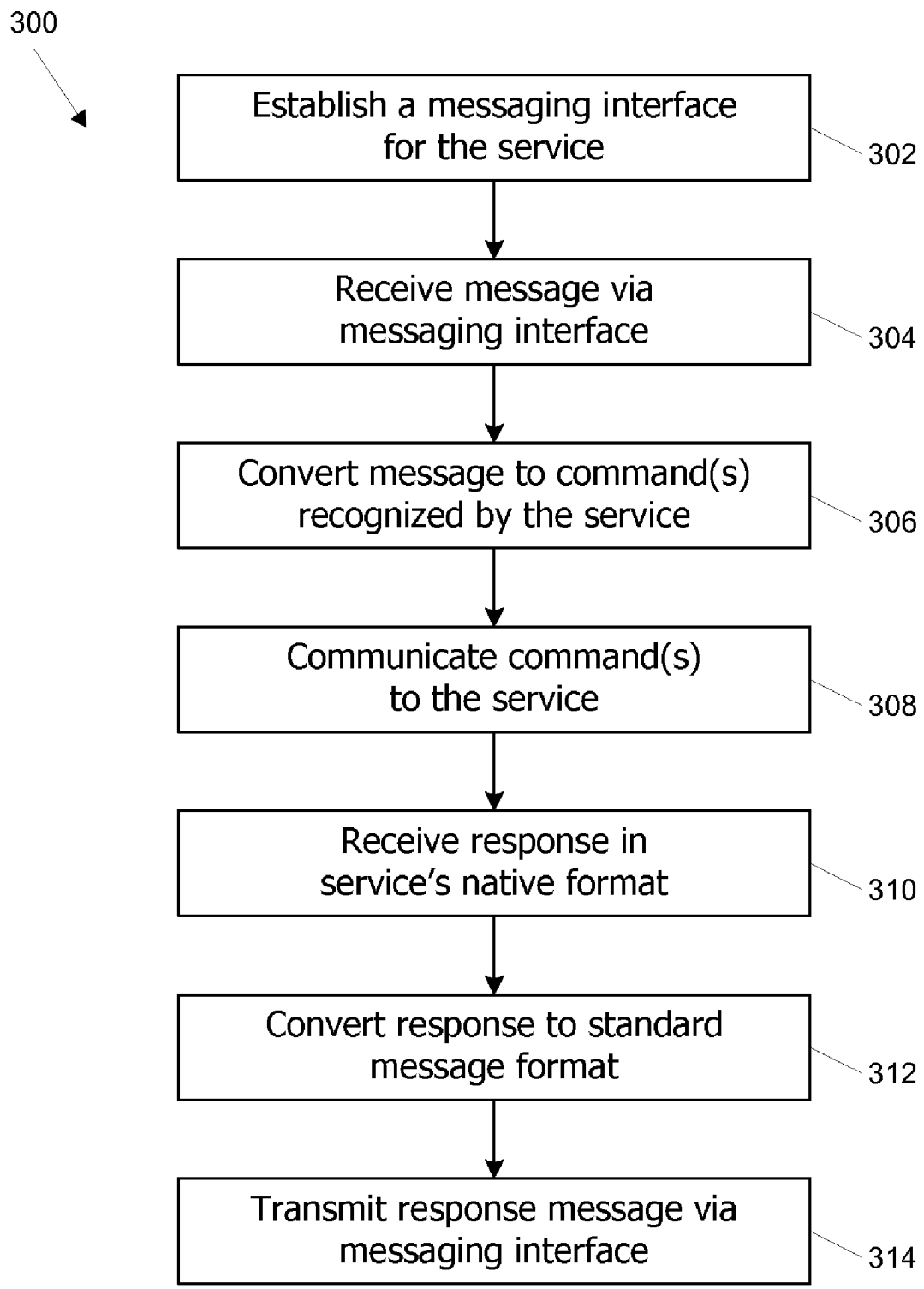
FIG. 3 is a flow chart of an operating process for a connector API that connects a service to an IMS system according to an embodiment of the present invention.

FIG. 3 is a flow chart of an operating process 300 for a connector API according to an embodiment of the present invention. At step 302, the connector API establishes a messaging interface for the service. Establishing the messaging interface may include communicating with IMS bus 102 to define port bindings and protocols for message transmission and receipt, publishing WSDL or other information identifying the messages that the connector API can receive and/or send, and the like. Once a messaging interface is established, the connector API can begin to receive and send messages via IMS bus 102.

At step 304, a message (typically a request) is received via the messaging interface. Examples of messages were described above with FIG. 2; it is to be understood that any message the connector API has defined itself as being capable of receiving may be received.

At step 306, the connector API converts the message to one or more commands that will be recognized by the connected service. These may be commands (e.g., function calls) in accordance with a proprietary interface of the connected service, operating-system commands, or the like.

At step 308, the connector API communicates the commands to the connected service, and at step 310, the connector API receives a response to the commands from the connected service. The response may be in the native (e.g., proprietary) format of the connected service. At step 312, the connector API converts the response to a message in a standard format (e.g., XML) that can be delivered via IMS bus 102. The response message advantageously includes information identifying the request message to which the response pertains and in some instances may identify an intended recipient for the response. At step 314, the connector API delivers the response to IMS bus 102.

It will be appreciated that the connector API process described herein is illustrative and that variations and modifications are possible. Steps described as sequential may be executed in parallel, order of steps may be varied, and steps may be modified or combined. For instance, in some cases (e.g., errors in the message, requests for general information about the service), the connector API may be able to generate a response message without communicating with the connected service. In other cases, generating a response may involve multiple communications between the connector API and the connected service. For instance, the connector API may communicate a first command to the connected service, wait for a response, then communicate one or more additional commands based in whole or in part on the response to the first command.

A response to a message may be directed back to the sender of the message, to a different service, or to the IMS bus without specifying a destination. In the last case, the IMS bus determines an appropriate destination (or destinations) based on information in the response (e.g., the identity of the message to which the response pertains) and routes the response accordingly. In some cases, the response may be detected as an event by the IMS bus and may trigger various other actions, such as sending messages to connected services or particular users. It is to be understood that in addition to handling incoming requests, a connector API may also implement other functionality such as a user interface and/or automated local request handler via which the connected service can initiate requests to other connected services.

Given an array of services connected via connector APIs, any client (including human users and/or automated processes) on any system connected to IMS bus 102 can use the Web Services Interface provided by IMS bus 102 to make requests of any connected service. The client does not have to know details of the targeted service (e.g., which database software it uses, which communications protocols it supports, etc.) and in some cases need not even specify the name or location of the targeted service. Further, as described below, the orchestration service of IMS bus 102 allows clients to define and automate complex transactions and workflows involving any number of connected services.

3. Centralized Services

In one aspect of the present invention, IMS bus 102 supports a number of centralized services to simplify and enhance interoperation of connected services. Centralized services are advantageously provided, e.g., in instances where uniformity across systems is desirable or where it is desirable to synchronize, coalesce, or standardize information stored on disparate connected services. In some embodiments, the centralized services do not store or manage media assets; instead, they are support services used to provide a tighter integration across the connected systems that do store and/or manage media assets.

In some embodiments, the centralized services described herein are implemented as computer programs (software) executing on appropriately configured computer systems (such as server platforms of generally conventional design) that are communicably connected to IMS bus 102. Multiple centralized services can be implemented on the same computer system, or implementation of a single centralized service can be distributed across multiple computer systems, e.g., in a server farm or mirrored server configuration. The particular implementation of a centralized service is not critical to the present invention.

Examples of centralized services will now be described. It is to be understood that some embodiments may include any or all of these services, or none of them, and/or additional centralized services.

3.1. Entity Registry Service

A first centralized service is represented by entity registry service 132 of FIG. 1. Entity registry service 132 advantageously provides centralized management of the entities authorized to act as clients in IMS system 100 and their rights to access various services, media assets, and metadata provided by the connected services. As used herein, the term "entity" encompasses individuals, business entities (e.g., business units), connected applications and/or services, and automated processes.

Figure 4:
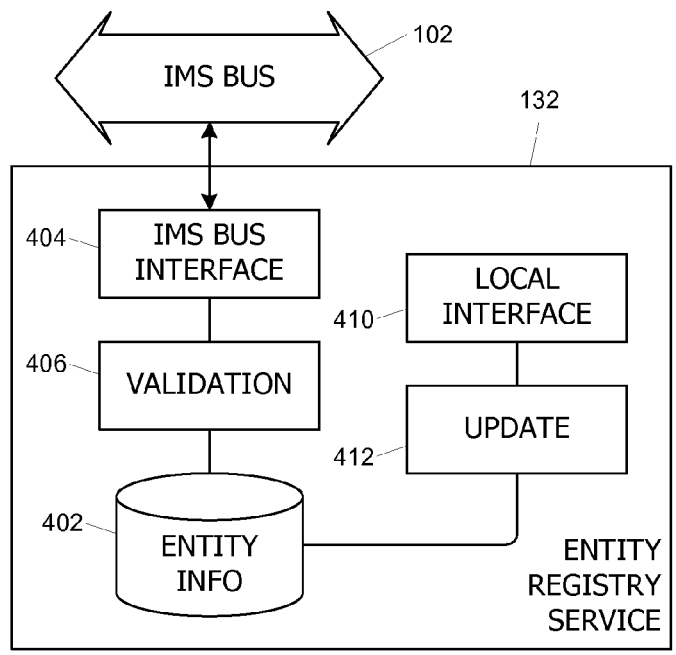
FIG. 4 is a block diagram of an entity registry service for an IMS system according to an embodiment of the present invention.

FIG. 4 is a block diagram of entity registry service 132 of FIG. 1 according to an embodiment of the present invention. Entity registry service 132, which may be implemented on a computer system (e.g., a server) of generally conventional design, maintains a database 402 of information related to all entities that are authorized to access IMS bus 102. Entity information database 402 advantageously includes a unique entity ID (e.g., a username or process identifier) for each entity, password information (where applicable), and information defining the entity's rights and permissions. For example, entity information database 402 may identify the connected services to which the entity has access and the type of access the entity is allowed (e.g., view metadata, request assets, update metadata, update assets, add new assets, etc.). Access permissions (or rights) may be set on a per-entity basis. Alternatively, groups of entities (e.g., users affiliated with a particular business unit, department, or organizational role; automated processes hosted on a particular computer system) may be defined, and some or all access permissions may be established on a per-group (rather than per-entity) basis. It is to be understood that entity groups may overlap (e.g., where groups are defined hierarchically or where a user has multiple organizational roles) and that one entity may belong to any number of groups. Further, in embodiments where one user may have multiple usernames and/or passwords specific different connected services, entity information database 402 may link the different usernames associated with a single user to a single entity ID, so that a particular user's access rights need not depend on the user ID via which that the user accesses IMS bus 102 or services connected thereto.

Entity registry service 132 includes an IMS bus interface 404 configured to send messages to and receive messages from IMS bus 102, e.g., using the same protocols and bindings as other connected services. IMS bus interface 404 communicates with various control modules such as a validation module 406. Validation module 406 advantageously allows entity registry service 132 to determine whether an entity that makes a request of any connected service is authorized to do so.

In some embodiments, each request message sent on IMS bus 102 includes information identifying the entity (e.g., user or process) that originated the request. Before responding to the request, the entity-identifying information is directed to entity registry service 132, which determines whether the requesting entity has sufficient permissions to receive the response. More specifically, IMS bus 102 may forward a request message from a client to IMS bus interface 404. IMS bus interface 404 directs the request message to validation module 406. Validation module 406 extracts the entity-identifying information from a received message, accesses entity information database 402 to retrieve corresponding entity rights information, and determines, based on the retrieved entity rights information and information in the request (e.g., the targeted service, the nature of the service requested), whether the request should be permitted to proceed. Responses can be filtered or requests can be denied entirely based on the determination by validation module 406.

Figure 5:
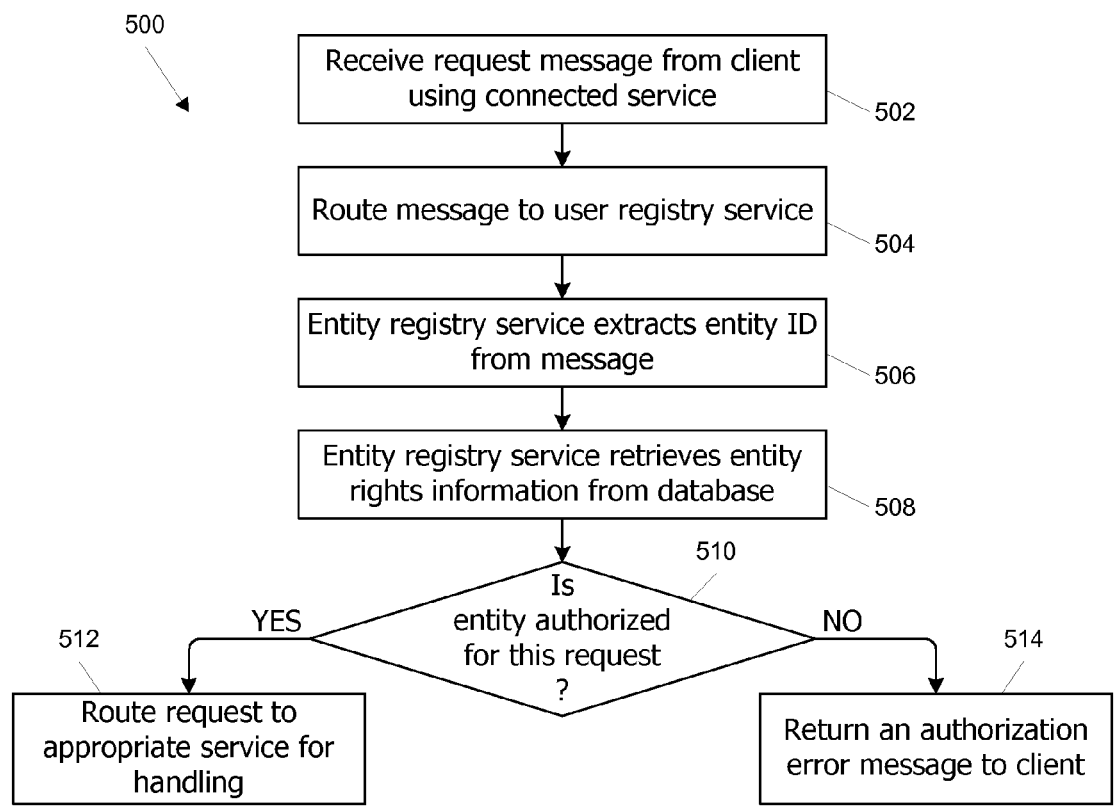
FIG. 5 is a flow diagram of an entity validation process that can be implemented in an entity registry service according to an embodiment of the present invention.

FIG. 5 is a flow diagram of an entity validation process 500 that can be implemented in validation module 406 according to an embodiment of the present invention. In this embodiment, all request messages are routed to entity registry service 132 prior to delivery to a connected service that will respond to the message. The request message is forwarded to the responding service only if entity registry service 132 authorizes delivery.

More specifically, at step 502, a request message from a client is received onto IMS bus 102. The message is routed to entity registry service 132 at step 504. At step 506, validation module 406 of entity registry service 132 extracts entity-identifying information from the message. This information may include, e.g., a username and/or password or other entity identification, and may also include a confirmation of the entity's identity provided by the originating service.

At step 508, validation module 406 retrieves entity rights information corresponding to the received entity-identifying information from entity information database 402. Step 508 may include mapping the entity-identifying information from the request to an entity ID in database 402. At step 510, validation module 406 determines, based on the entity rights information, whether the entity is authorized to make the request included in the request message. If so, then at step 512, the message is forwarded via IMS bus interface 404 to the appropriate connected service for handling. If not, then at step 514, an authorization error message is returned to the requesting client, advising the client that the request cannot be completed. The request message is not delivered to a service. Where process 500 is used, a connected service that receives a message can assume that it is authorized to act on the message.

It will be appreciated that the validation process described herein is illustrative and that variations and modifications are possible. Steps described as sequential may be executed in parallel, order of steps may be varied, and steps may be modified or combined. For instance, IMS bus 102 may deliver a copy of the message to entity registry service 132, and after performing the validation operation, entity registry service 132 may return a response message signaling to IMS bus 102 to deliver the message to the appropriate connected service or not to deliver the message. In some embodiments, the entity registry service may maintain a security log of successful and unsuccessful requests; such a log can be used to analyze possible security breaches. In some embodiments, entity information database 402 can be queried via IMS bus 102, e.g., to find out what rights a particular entity has. In still other embodiments, entity validation is initiated by the connected service that receives a request; for instance, IMS bus 102 may send the request to a service without first validating it; before executing the request, the service may send a validation request to entity registry service 132. Such validation requests can be handled by validation module 406 in the manner described above, with authorization or denial messages being returned to the service that made the validation request.

In addition to validation module 406, entity registry service 132 advantageously supports other functional modules that provide access to entity information database 402. For example, an update module 408 allows authorized users to update entity information database 402. Via update module 408, new entities can be added to the database, existing entities can be removed, and rights associated with individual entities or groups of entities can be modified. To reduce the risk of unauthorized updates, in one embodiment, update module 408 is not communicably coupled to IMS bus 102; instead a "local" interface 410 is provided via which update module 408 can be accessed. Local interface 410 advantageously provides its own user authentication protocol to verify that users attempting to update entity information database 402 are authorized to do so; this user authentication protocol may be based on entity information database 402 or a separate database, and the locations form which local interface 410 can be accessed may be restricted, e.g., to certain computer systems.

3.2. Asset ID Service

A second centralized service is represented by asset ID service 134 of FIG. 1. It is contemplated that the multiple services connected via IMS bus 102 may include overlapping collections of media assets and/or metadata. For instance, the same media asset might be stored on and/or indexed by two or more of connected services 114-118. To help detect such duplication, each asset can be assigned a global asset ID (also referred to as registering the asset) at the time of its creation. This global asset ID, which is unique across all assets stored on connected services in IMS system 100, can travel with the asset throughout its lifecycle, allowing duplicates to be readily detected. It should be noted that connected services 114-118 may also assign local asset IDs to each media asset they store and/or index, and a media asset may have one or more local asset IDs in addition to its global asset ID.

Figure 6:
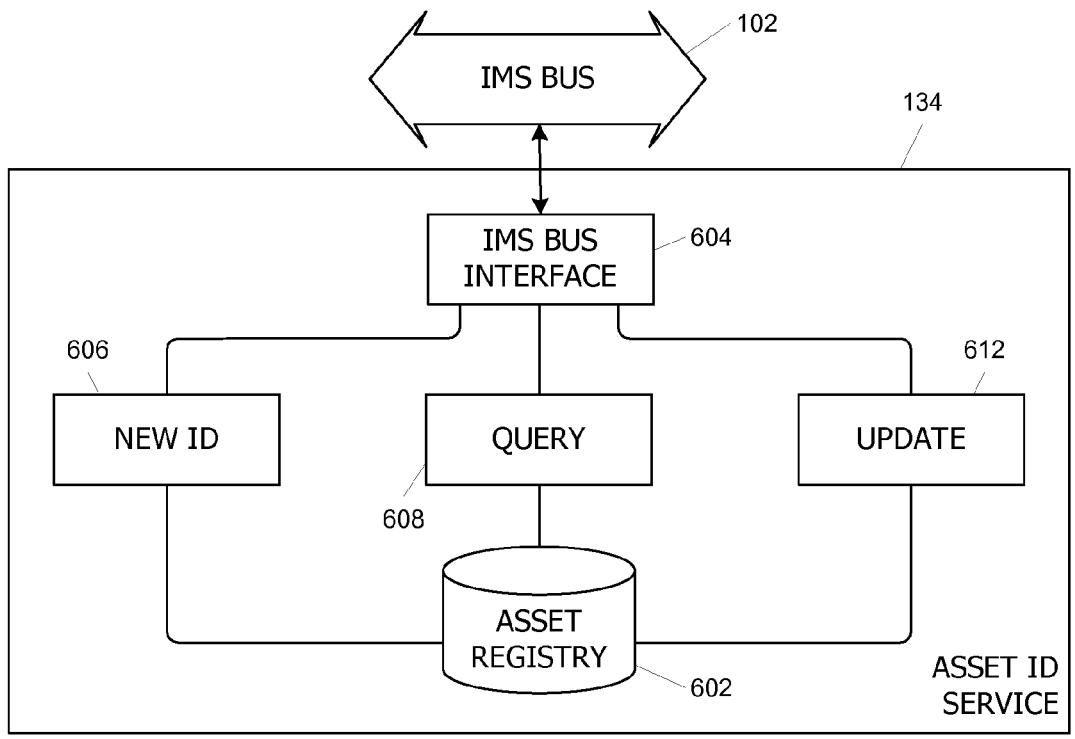
FIG. 6 is a block diagram of an asset ID service for an IMS system according to an embodiment of the present invention.

FIG. 6 is a block diagram of asset ID service 134 according to an embodiment of the present invention. Asset ID service 134 advantageously manages an asset registry (e.g., database) 602 that includes a listing of all currently assigned asset IDs and information about the corresponding asset, such as, e.g., a title, format, date of creation of the asset and/or the global asset ID, originating service or system (i.e., the service or system that requested assignment of the global asset ID), current location of the asset, any local asset IDs that correspond to the asset on various connected services, and so on. Asset registry 602 may also track provenance of registered assets, e.g., by storing information in the database as to which user (or other entity) registered each asset.

Asset ID service 134 includes an IMS bus interface 604 configured to send messages to and receive messages from IMS bus 102, e.g., using the same protocols and bindings as other connected services. IMS bus interface 604 communicates with various control modules such as a new ID module 606, a query module 608, and an update module 612.

New ID module 606 services requests to create new asset IDs. In one embodiment, when a new asset is created (or loaded onto a connected service), the connected service advantageously sends a request via IMS bus 102 to asset ID service 134 requesting assignment of a global asset ID to the asset. IMS bus interface 604 directs all such messages to new ID module 606. New ID module 606 selects an unused global asset ID to become the global asset ID for the new asset. In one embodiment, the global asset IDs may be serial numbers; in other embodiments, any machine-generated identifier may be used as long as each identifier is unique within the IMS bus system. (In some embodiments, the identifier may be universally unique.) In some embodiments, the request for a new global asset ID includes descriptive information about the asset, and this information can be stored in the registry. New ID module 606 may check asset registry 602 for an existing registered asset that matches the descriptive information before assigning the new global asset ID. In the event of a match, new ID module 606 may generate a response message reporting the existence of a matching record and requesting confirmation that the asset should be registered.

Query module 608 services various queries that may be made to asset registry 602. IMS bus interface 604 directs all query messages to query module 608 for processing. In one embodiment, the types of queries supported include queries related to a specific asset. For example, a client may provide descriptive information for an asset (e.g., title or a local asset ID) and request the corresponding global asset ID. A client may also request other information from asset registry 602, such as provenance information or other descriptive information for a particular asset.

Update module 612 processes all requests to update existing records in asset registry 602. In some embodiments, when descriptive information about the asset changes, an update message can be sent to asset ID service 134 via IMS bus 102. Update service 612 updates records from asset registry 602 and writes the updated records back to asset registry 602. Update module 612 may also process requests to remove assets from asset registry 602. Entity validation procedures, e.g., as described above, can be used to prevent unauthorized clients from updating asset records.

In some embodiments, asset ID service 134 may also include a local interface (not explicitly shown), via which clients can access any or all of the service modules 606-612 without using IMS bus 102. Some of the service modules or certain functions thereof might be accessible only via the local interface. For instance, removal of an asset record or updating of ownership information might be restricted to the local interface.

3.3. Metadata Mapping Service

A third centralized service is represented by metadata mapping service 136 of FIG. 1. As described above, various connected services 114-118 may maintain their own databases (or indexes) of media assets, and the databases may contain various metadata descriptive of each asset. Because connected services 114-118 are not restricted to using particular database implementations or schemas (i.e., specifications of the metadata fields and values recognized by a database), it is contemplated that different connected services will in fact implement different schema. Thus, metadata field names and/or values might be different from one connected service to the next. The differences can range from trivial (e.g., date formats) to more substantive (e.g., fields labeled "title" vs. "name" or whether a particular field is supported at all). To facilitate communication between disparate services, it is useful to be able to map the metadata schema used by one service onto that used by another service. Metadata mapping service 136 advantageously provides this mapping functionality for all connected services.

Figure 7:
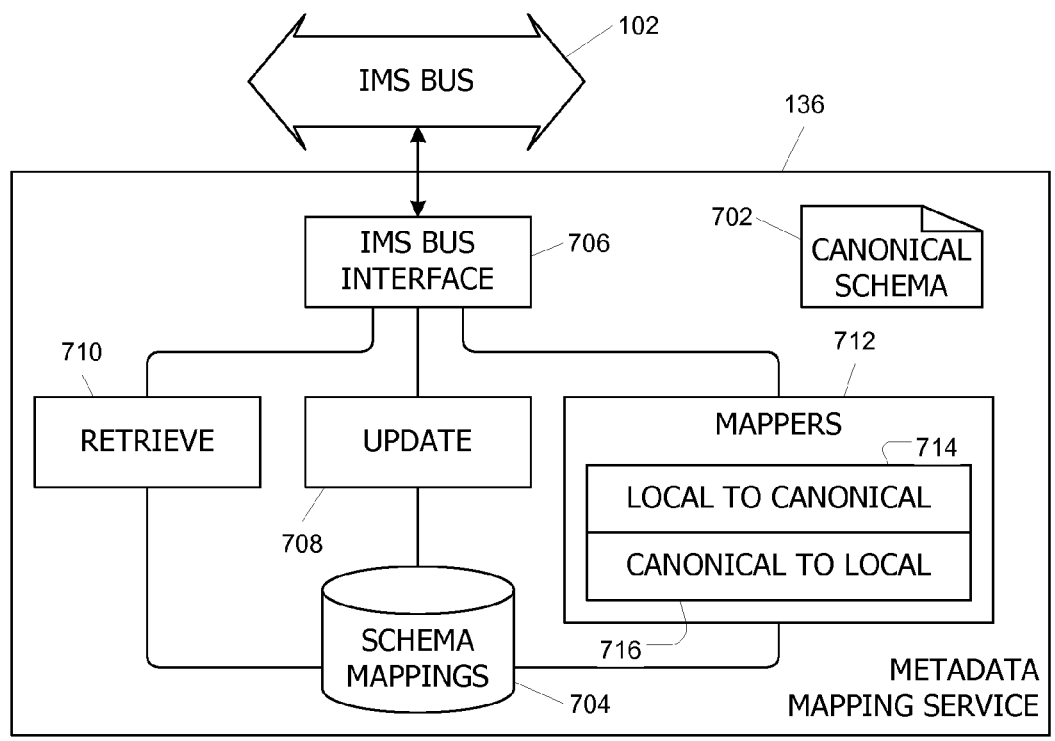
FIG. 7 is a block diagram of a metadata mapping service for an IMS system according to an embodiment of the present invention.

FIG. 7 is a block diagram of metadata mapping service 136 according to an embodiment of the present invention. Metadata mapping service 136 maintains a canonical (or global) metadata schema 702 (which may be, e.g., an XML document or other suitable format). Canonical schema 702 defines a set of metadata fields by name, format, relationship (if any) to other fields, and so on. Canonical schema 702 is advantageously defined to be applicable to all media types and file formats so that any asset managed using IMS bus 102 can be described according to canonical schema 702.

Metadata mapping service 136 also maintains a schema mapping database 704 that stores mapping information. Each entry in schema mapping database 704 defines a mapping between canonical metadata schema 702 and a "local" metadata schema of one of the connected service. In some embodiments, canonical schema 702 is published to connector API developers, and each connected service provides media mapping service 136 with mapping information defining the mapping between its local metadata schema and canonical schema 702. It should be noted that it is not necessary to define a mapping between one local metadata schema and another.

Metadata mapping service 136 includes an IMS bus interface 706 configured to send messages to and receive messages from IMS bus 102, e.g., using the same protocols and bindings as other connected services. IMS bus interface 706 communicates with various control modules such as an update module 708, a retrieval module 710 and a mapping module 712.

Update module 708 manages all updates to mapping database 704. In one embodiment, a connected service sends a mapping update request via IMS bus 102 at appropriate times, such as when the service initially connects to IMS bus 102 or when the mapping changes. IMS bus 102 directs the request to IMS bus interface 706, which delivers the request to update module 708. Update module 708 accesses mapping database 704 to retrieve the mapping information for the requesting service, updates the record, and returns the updated record to mapping database 704. In one embodiment, update module 708 accepts update requests only if they originate from the service whose mapping information is to be updated; additional or alternative authentication measures may also be supported.

Retrieval module 710 retrieves records from mapping database 704. In some embodiments, a client (e.g., a connected service or a user of a connected service) may send a message via IMS bus 102 to request mapping information for itself or for another connected service; retrieval module 710 advantageously responds to such requests. Retrieval module 710 may also be invoked, e.g., by update module 708 or mapping module 712 in the course of their respective operations.

Mapping module 712 performs mappings between local schema and canonical schema. In one embodiment, mapping module 712 includes a local-to-canonical mapping unit 714 and a canonical-to-local mapping unit 716, which together support bidirectional mapping and allow any schema to be mapped to any other schema. For instance, to map metadata from a first local schema to a second local schema, local-to-canonical mapping unit 714 can be used to map the metadata from the first local schema to the canonical schema, after which canonical-to-local mapping unit 716 can be used to map the metadata from the canonical schema to the second local schema. Mapping units 714 and 716 advantageously access mappings database 704 to retrieve appropriate mapping information.

In some embodiments, a connected service may directly request a mapping by sending a message including the metadata to be mapped and information identifying the current schema and the target schema. In other embodiments, IMS bus 102 delivers metadata for which remapping is desired to metadata mapping service 136 transparently to the requesting client.

Figure 8:
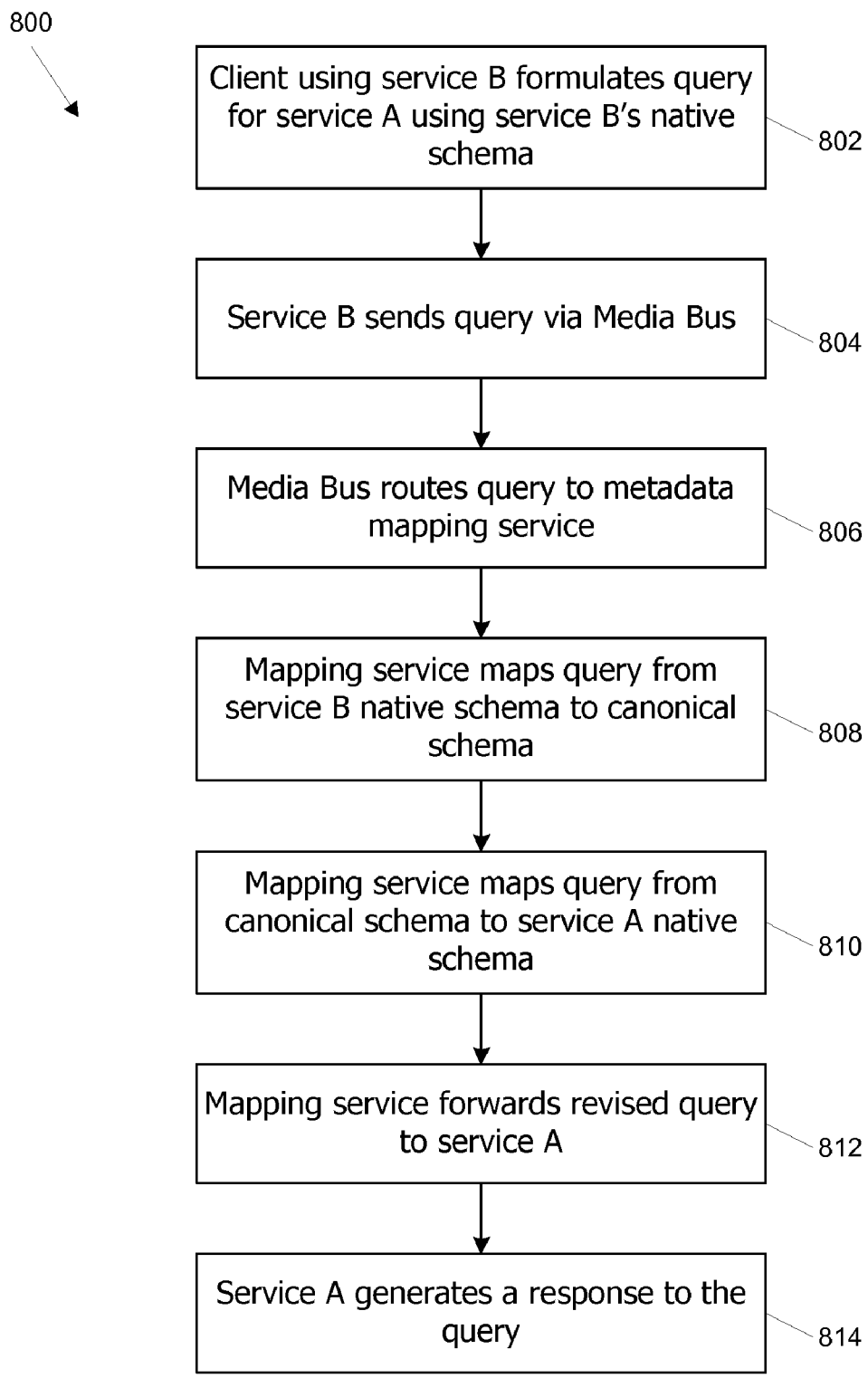
FIG. 8 is a flow diagram of a process in which a client using one service queries another service in an IMS system according to an embodiment of the present invention.

In one such embodiment, metadata mapping service 136 is used to facilitate searching of one connected service's local metadata index by another connected service. FIG. 8 is a flow diagram of a process 800 in which one service (designated "service B" for purposes of description) queries another service (designated "service A") according to an embodiment of the present invention.

At step 802, a client (e.g., a user or automated process) using service B formulates a query for service A using service B's native schema. At step 804, service B sends the query via IMS bus 102. At step 806, IMS bus 102 directs the query to IMS bus interface 706 of metadata mapping service 136. An entity validation process, not explicitly shown, may precede step 806; process 500 of FIG. 5 or another suitable process may be used.

At step 808, metadata mapping service 136 maps the query from service B's local schema to the canonical schema. For instance, IMS bus interface 706 may forward the query to mapping module 712. Mapping module 712 invokes local-to-canonical mapping unit 714 to map the query from service B's local schema to the canonical schema. In performing the mapping, unit 714 advantageously relies on mapping information previously supplied by service B and stored in mapping database 704.

At step 810, metadata mapping service 136 maps the query from the canonical schema to service A's local schema. For instance, mapping module 712 may invoke canonical-to-local mapping unit 716 to map the query from the canonical schema to service A's local schema. In performing the mapping, unit 716 advantageously relies on mapping information previously supplied by service A and stored in mapping database 704. The request message can then be modified to correspond to service A's local schema.

At step 812, metadata mapping service 136 forwards the request, including the modified query, to service A via IMS bus 102. At step 814, service A executes the query and generates a response, which is transmitted to the requester (service B) via IMS bus 102. In some embodiments, the response can be remapped from the schema used by service A to the schema used by service B using metadata mapping service 136.

It will be appreciated that the mapping process described herein is illustrative and that variations and modifications are possible. Steps described as sequential may be executed in parallel, order of steps may be varied, and steps may be modified or combined. For example, in one alternative embodiment, metadata mapping service 136 returns the remapped metadata to IMS bus 102, which uses the remapped metadata to generate the modified request message that is delivered to service A.

Metadata mapping may also be used in other contexts. Some examples will be described below; further examples will be apparent to those skilled in the art in view of the present teachings.

3.4. Global Metadata Search

A fourth centralized service, represented in FIG. 1 by global metadata search service 138, provides a global search functionality. Those skilled in the art will recognize that process 800 could be extended to allow a user of service B to search any number of other services in parallel in a federated search across all connected services. A global federated search using this approach can be slow, as the request would have to be remapped into multiple different schemas, then forwarded as multiple requests to multiple systems. Further, such a search can result in a considerable amount of duplicative information being retrieved, and it may be desirable to implement an additional step in which the service B connector merges responses from all queried services. In addition, differences in metadata fields and formats may make it difficult to formulate a single effective query for a global federated search. Global metadata search service 138 simplifies global federated search by providing a centralized search capability.

Figure 9:
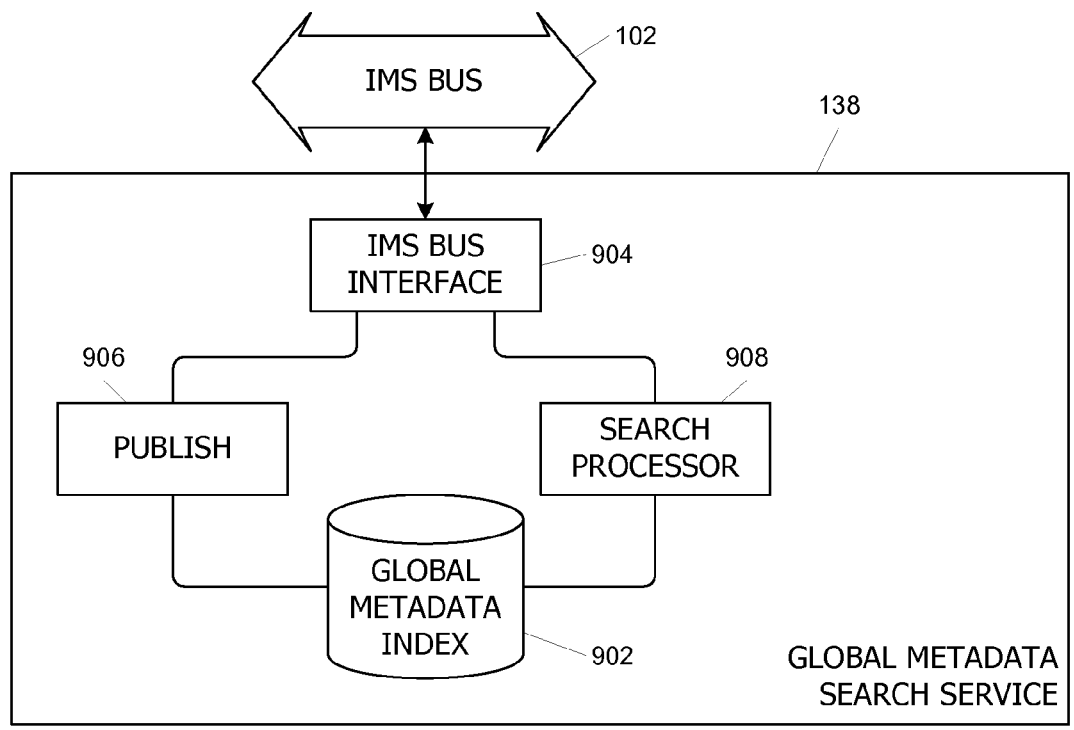
FIG. 9 is a block diagram of a global metadata search service for an IMS system according to an embodiment of the present invention.

FIG. 9 is a block diagram of global metadata search service 138 according to an embodiment of the present invention. Global metadata search service 138 advantageously maintains global metadata index 902, a centralized index (or database) of metadata asset records from all connected services. Metadata records in global metadata index 902 are advantageously stored using canonical schema 702 (FIG. 7) as defined by metadata mapping service 136.

Global metadata search service 138 includes an IMS bus interface 904 configured to send messages to and receive messages from IMS bus 102, e.g., using the same protocols and bindings as other connected services. IMS bus interface 904 communicates with various control modules such as a publisher module 906 and a search processing module 908.

In some embodiments global metadata index 902 is populated by pushing information from the various connected services to global metadata search service 138, rather than by operating global metadata search service 138 to pull information. Publisher module 906 advantageously populates and updates global metadata index 902 in response to requests from various connected services. For example, IMS bus interface 904 may be configured to receive a "publish" message from any connected service. The publish message advantageously includes metadata descriptive of an asset (or multiple assets) for which the connected service has determined that metadata should be made available via IMS bus 102. In some embodiments, the connected service defines the metadata included in the publish message using the canonical metadata schema; in other embodiments, the connected service provides metadata according to its local schema, and mapping service 136 is used to map the metadata into the canonical schema before the publish message is delivered to global metadata search service 138.

IMS bus interface 904 delivers the publish message to publisher module 906. Publisher module 906 formats the metadata appropriately and adds or updates a record in global metadata index 902 to reflect the newly published metadata. In embodiments where the publish message is delivered to global metadata search service 138 in a local schema, publisher module 906 may be configured to communicate with metadata mapping service 136 described above (e.g., via IMS bus 102 or another channel) to remap the metadata into the canonical schema.

Figure 10:
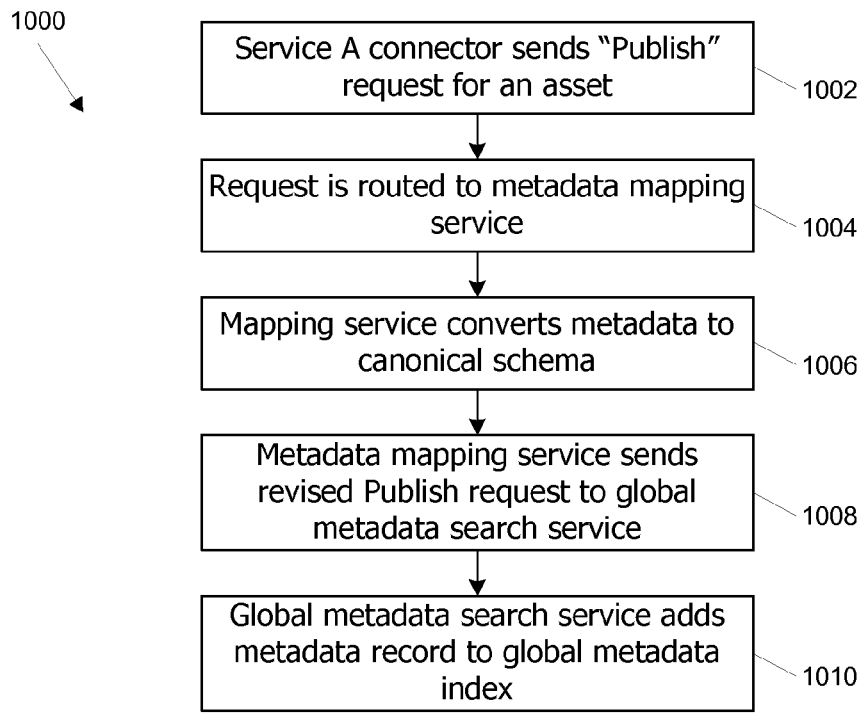
FIG. 10 is a flow diagram of a process for publishing a metadata record for a media asset to a global metadata index according to an embodiment of the present invention.

FIG. 10 is a flow diagram of a process 1000 for publishing an asset record to global metadata index 902 according to an embodiment of the present invention. At step 1002 a connected service (e.g., service A) sends a "publish" message for one of its assets onto IMS bus 102. Depending on the nature of service A, this may be an asset that is owned by, indexed by, or stored on service A.

At step 1004, IMS bus 102 directs the message to metadata mapping service 136. At step 1006, metadata mapping service 136 converts the metadata from service A's local schema to the canonical schema using mapping information previously provided by service A. At step 1008, metadata mapping service 136 forwards the request, including the canonical metadata, to IMS bus interface 904 of global metadata search service 138. IMS bus interface 904 delivers the request to publisher module 906, which adds the canonical metadata record to global metadata index 902 at step 1010. Publisher module 906 may augment the metadata record with additional information not explicitly defined by the connected service, such as an identifier of the service that published the record, a timestamp for the publication, and so on.

It will be appreciated that the publication process described herein is illustrative and that variations and modifications are possible. Steps described as sequential may be executed in parallel, order of steps may be varied, and steps may be modified or combined. A connected service may elect to publish any or all of the metadata for its managed assets at any time.

The use of publish messages (or any other "push" technique) to populate global metadata index 902 advantageously allows the connected services to retain control over the visibility of their metadata records, just as they would in a local search. A connected service can keep information related to an asset secret from other connected services by opting not to publish its metadata.

In some embodiments, the publish message may also include access-rights information specifying which entities (e.g., users and/or automated processes) may view the published metadata. Publisher module 906 advantageously includes this access-rights information in the metadata records stored in global metadata index 902 so that an owning service's access preferences can be respected when global metadata index 902 is searched.

In some embodiments, publisher module 906 is also configured to respond to a "depublish" message, which can be used to remove previously published metadata. The depublish message can be used to keep global metadata index 902 updated, e.g., when assets and/or asset records are removed from a connected service or when a connected service determines that it is no longer desirable to provide particular information to other connected services.

In an alternative embodiment, global metadata search service 138 could be operated to pull data from connected services, e.g., by requesting asset metadata via IMS bus 102. In such embodiments, the connected services may still be able to maintain control over which records are pulled into global metadata index 902. For example, the connected service might support security settings for its metadata records, and an information pulling agent can be configured to pull the metadata only to the extent permitted by the security settings. Thus, each connected service could retain control over which (if any) asset records are published, even where information is pulled into global metadata index 902.

Search processor 908 of global metadata search service 138 supports searching of global metadata index 902 by connected services. A client using any connected service can search global metadata index 902 by sending a search request message to global metadata search service 138 via IMS bus 102. The search request message advantageously includes a query defining the type of information sought, e.g., by specifying parameters for various metadata fields. IMS bus interface 904 of global metadata search service 138 forwards the message to search processor 908, which executes the search and generates a search report that may include, e.g., a list of "hits" (i.e., items in global metadata index 902 that match the parameters of the search query). The report may include any or all of the metadata corresponding to each hit. Search processor 908 returns the report to IMS bus interface 904, which transmits a response message including the report to the requesting service via IMS bus 102.

Figure 11:
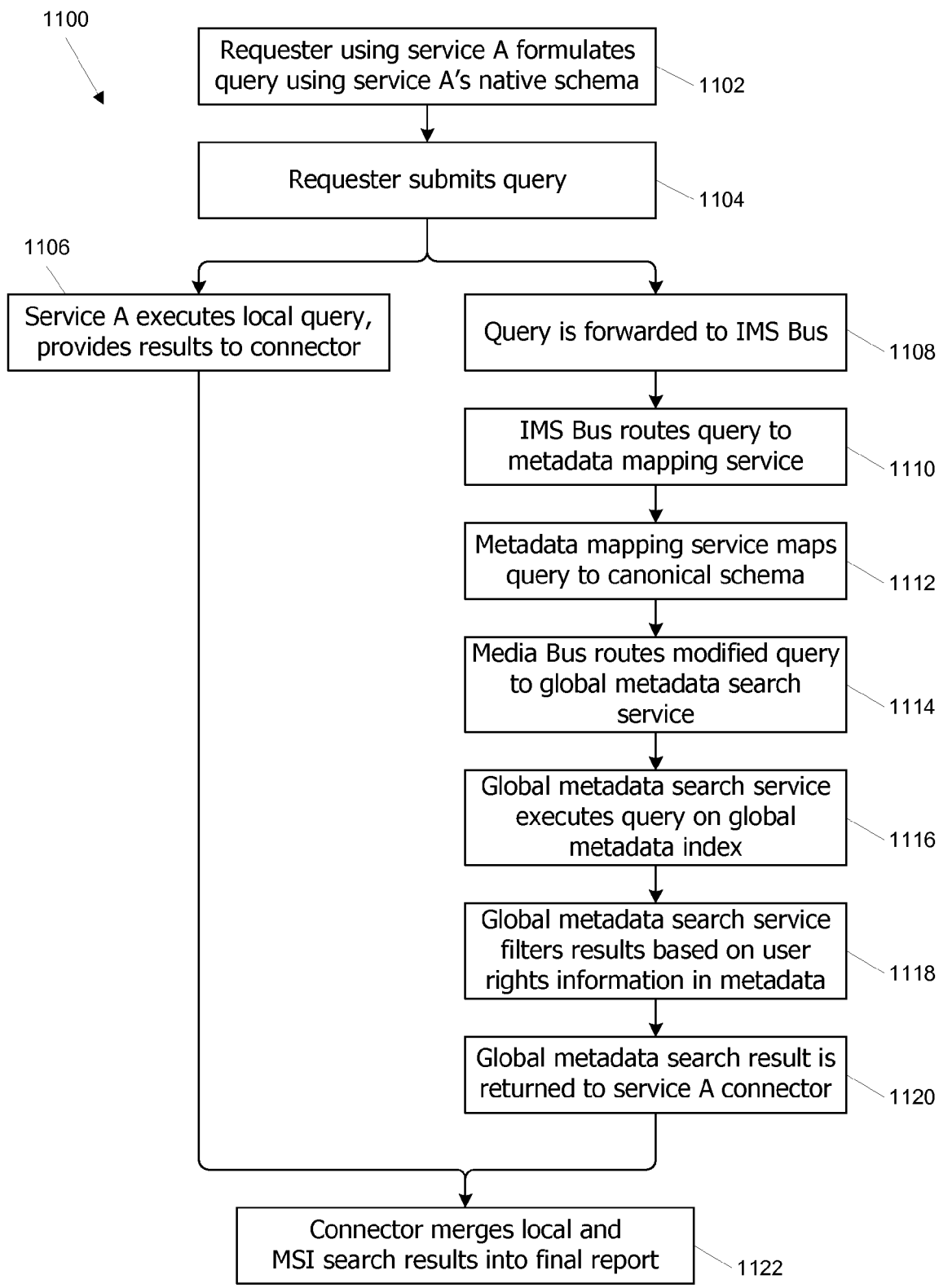
FIG. 11 is a flow diagram of a process for performing a global federated search in an IMS system according to an embodiment of the present invention.

FIG. 11 is a flow diagram of a process 1100 for performing a global federated search according to an embodiment of the present invention. In this embodiment, the global federated search includes a search of one connected service's local metadata store in addition to a search of global metadata index 902. The querying client is presented with a single integrated search report covering both of the searches. Searching a local metadata store in parallel with global metadata index 902 allows the client to locate locally stored metadata regardless of whether the metadata was published to global metadata index 902.

More specifically, at step 1102, a requester—which may be any entity using a connected service (service A)—formulates a query using service A's local schema. At step 1104, the requester submits the query to service A. The query is executed locally using service A's native search functionality at step 1106.

At the same time (or sequentially), the connector API for service A forwards the query to IMS bus 102 (step 1108). At step 1110, IMS bus 102 directs the query to metadata mapping service 136. (As described elsewhere, the query message may first be directed to entity registry service 132 for validation of the requester's right to make the query, with delivery to mapping service 136 being conditional on successful validation.) At step 1112, metadata mapping service 136 maps the query from service A's local schema to the canonical schema. Thus, a modified query conforming to the canonical schema is generated. At step 1114, IMS bus 102 delivers the modified query to IMS bus interface 904 of global metadata search service 138, which forwards the query to search processor 908.

At step 1116, search processor 908 executes the query on global metadata index 902 and assembles the results into a search report. Executing the query may include conforming the query to a database protocol applicable to global metadata index 902, as is known in the art. Assembling the results may include consolidating duplicative results, sorting and formatting results, and so on. In some embodiments, assembling the results may include ranking the results according to a relevance score, e.g., so that the most relevant results can be presented first. The relevance score may be determined by comparing the query to the retrieved metadata record; in some embodiments, other information (if available) may also be used in determining relevance. In some embodiments, the requester's affiliation with a particular business unit might also affect the relevance score. For instance, if a search query includes terms that could pertain to assets in different categories, such as television series, theatrical movie, and theme-park attraction, the ranking of the results might depend on the requester's business-unit affiliation. Thus, if the requester is a user is employed by a theme park, results related to the theme-park attraction might be ranked highest, while if the requester is a user is employed by a movie studio, results related to the theatrical movie might be ranked highest.

At step 1118, search processor 908 filters the results based on the entity rights information contained in the metadata, removing any results that the requester is not authorized to view. In some embodiments, search processor 908 may also communicate with asset ID service 134 (e.g., via IMS bus 102 or another communication path) to verify the requester's rights to access metadata pertaining to each asset represented in the search results.

At step 1120, search processor 908 delivers the search report to IMS bus interface 904, which returns the global search result to service A via IMS bus 102. Returning the search result to service A may include, e.g., using metadata mapping service 136 to convert the global search result from the canonical schema to service A's local schema.

At step 1122, service A's connector advantageously merges the global search report received via IMS bus 102 with the local search result from step 1106, thereby generating a final report. If the global search report is delivered to service A's connector using the canonical metadata schema, step 1122 may include communicating with metadata mapping service 136 to remap the metadata in the global search report to service A's schema.

It will be appreciated that the global search process described herein is illustrative and that variations and modifications are possible. Steps described as sequential may be executed in parallel, order of steps may be varied, and steps may be modified or combined. Performing the search in parallel on a local data store and a global metadata index allows the user to see local assets that have not been published to the global metadata index without performing a separate local query. It should be noted that in some embodiments, some connector APIs might not support a federated local and global query.

3.5. Nomenclature Service

A fifth centralized service, represented by nomenclature service 140 of FIG. 1, supports canonicalization of the content of various metadata fields, such as titles of projects, names of characters and/or actors, and so on. Nomenclature service 140 further enhances federated search by allowing a uniform nomenclature to be defined across the organization.

As described above, it is contemplated that the various media asset management services 114-118 connected to IMS bus 102 may be under control of different business units within a large organization. It is further contemplated that different business units may be involved in various aspects of a single large project, such as making and distributing a feature-length motion picture. Such a project may involve the creation of a large number of media assets, with different assets being created by different organizations. In addition to the movie itself, there will usually be a variety of clips created for advertising and publicity, still photos, posters, soundtrack album, and so on. Ideally, all such assets would be associated with the title of the movie project to which they pertain. However, users on different services working on different aspects of the project might adopt different variants of the title; for instance, the recent movie "Pirates of the Caribbean: Dead Man's Chest®" might be identified by that title or by an alternative title such as "Pirates of the Caribbean 2™" or "Dead Man's Chest™." Queries using one title might not find assets or asset records identified by one of the alternatives.

Figure 12:
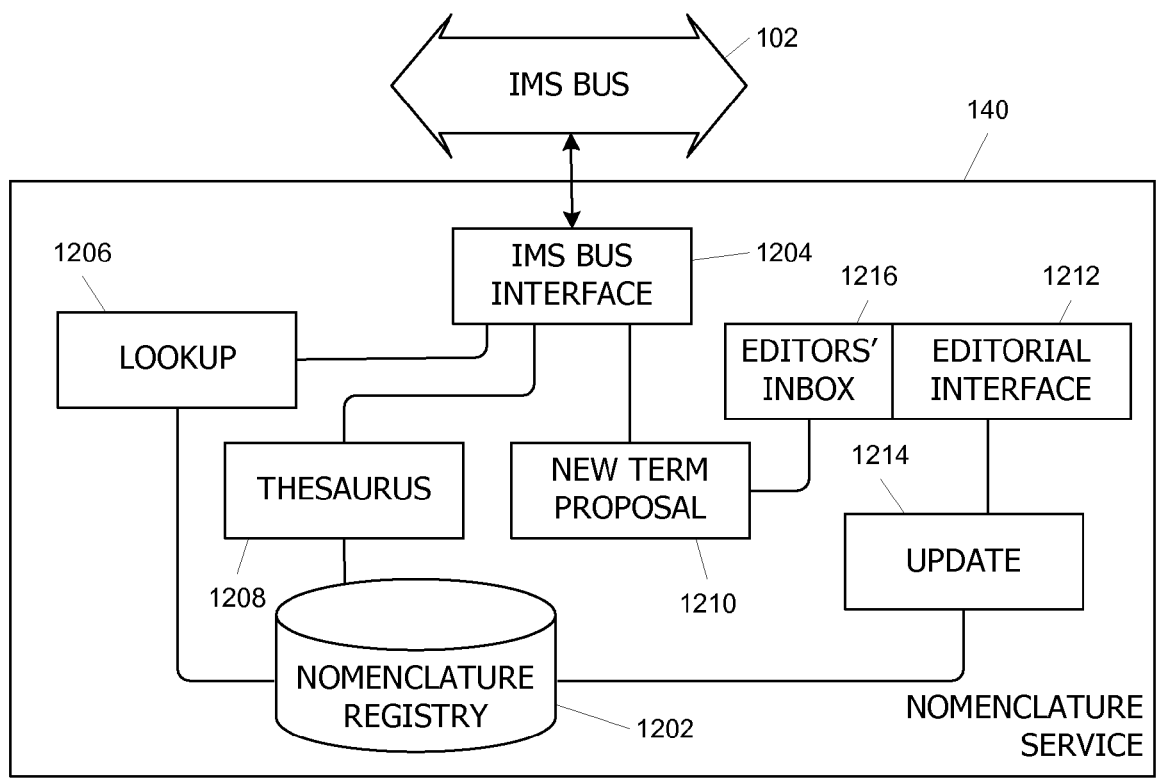
FIG. 12 is a block diagram of a nomenclature service for an IMS system according to an embodiment of the present invention.

FIG. 12 is a block diagram of nomenclature service 140 according to an embodiment of the present invention. Nomenclature service 140 advantageously maintains a nomenclature database 1202 that defines and prescribes canonical terms. The record for each term included in the nomenclature database 1202 specifies the canonical term and links that term to any associated alternatives, including variants, misspellings, etc. The record may also include definitional information for each canonical term (e.g., "Pirates of the Caribbean: Dead Man's Chest®" could be defined as "the second movie in the 'Pirates of the Caribbean®' series, released in 2005, starring Johnny Depp . . . ."). Any term for which standardized usage across the organization is desired may be included in nomenclature database 1202, including but not limited to project titles, names of artists, names of characters, names of business units, names of file formats, etc.

Nomenclature service 140 includes an IMS bus interface 1204 configured to send messages to and receive messages from IMS bus 102, e.g., using the same protocols and bindings as other connected services. IMS bus interface 1204 communicates with various control modules such as a lookup module 1206, a thesaurus module 1208, and a new term proposal module 1210. As described below, lookup module 1206 and thesaurus module 1208 read nomenclature database 1202 but do not modify it. New term proposal module 1210 is used to submit proposed modifications to nomenclature database 1202.

Nomenclature database 1202 is advantageously managed by an editorial team consisting of one or more individuals (e.g., persons in the organization). Nomenclature service 140 includes an editorial interface 1212 via which members of the editorial team can gain access to an update module 1212 that supports modification of the content of nomenclature database 1202. Other users (and processes) advantageously do not have access to editorial interface 1212. In some embodiments, editorial interface 1212 is not communicably coupled to IMS bus 102. Editorial interface 1212 advantageously provides its own user authentication protocol to verify that users attempting to access nomenclature database 1202 are authorized to do so; this user authentication protocol may be based on the centralized user information database 402 of FIG. 4 or a separate database, and the locations from which editorial interface 1212 can be accessed may be restricted, e.g., to certain computer systems.

In one embodiment, as each new media-related project is created, the editorial team determines the official title and other canonical terms to be associated with that project and adds them to nomenclature database 1202 via editorial interface 1212 interacting with update module 1214. The editorial team may also provide definitional information and such variants as the team considers to be worthy of inclusion (shortened forms, likely misspellings, etc.). As the project progresses, canonical terms may be modified by the editorial team via editorial interface 1212 and update module 1214.

Anyone involved in media development may submit proposed canonical terms for consideration by the editorial team. In one embodiment, users can propose terms via IMS bus 102. For example, a user can send a term proposal message via IMS bus 102 from any connected service to nomenclature service 104. IMS bus interface 1204 of nomenclature service 104 directs such messages to term proposal module 1210. Term proposal module 1210 extracts the proposal and forwards it to an "editors' inbox" 1216 that is readable by the editorial team via editorial interface 1212. In some embodiments, term proposal module 1210 may process the proposal before forwarding to editors' inbox 1216. For instance, term proposal module 1210 may access nomenclature database 1202 to determine whether the proposed term is already present (e.g., as a canonical term or variant thereof); if the proposed term is present, term proposal module 1210 may automatically generate a response message to the user indicating that the proposed term has already been considered and advising of its current status. Where the proposed term is already present, term proposal module 1210 might not forward the term to editors' inbox 1216, so that the editorial team does not have to consider the same or similar terms repeatedly.

Lookup module 1206 and thesaurus module 1208 provide access to information in nomenclature database 1202 via IMS bus 102. For example, a client may send a message via IMS bus 102 to nomenclature service 140 requesting the canonical term corresponding to a character string included as a message parameter. The message is delivered to lookup module 1206, which searches nomenclature database 1202 using the character string and identifies possible canonical terms. These terms (along with their definitions) can be returned to the client in a response message via IMS bus 102, to assist the client in selecting an appropriate canonical term for the client's purpose.

Thesaurus module 1208 allows clients to request the canonical term corresponding to a character string as well as related terms. For instance, if the character string corresponds to a canonical movie title, related terms might include names of characters and/or actors in the movie, names of related movies (e.g., sequels and/or prequels), and the like. A client sends a message via IMS bus 102 to nomenclature service 140 requesting a thesaurus lookup of a character string included as a message parameter. The message is delivered to thesaurus module 1208, which searches nomenclature database 1202 using the character string and identifies possible canonical terms as well as other related terms. The identified terms (and optionally their definitions) can be returned to the client in a response message via IMS bus 102, to assist the client in selecting appropriate canonical terms for the client's purpose. It should be noted that in some embodiments, a single thesaurus request could return all of the canonical terms related to a particular project; some implementations allow a user to restrict the response to a subset of canonical terms (e.g., only character names or only titles).

Nomenclature service 140 can operate in combination with other centralized services, particularly global metadata search service 138 described above. For instance, as noted above, metadata records submitted to global metadata search service 138 are advantageously remapped to the canonical metadata schema. The metadata representation stored in global metadata index 902 of FIG. 9 can be further standardized by canonicalizing some or all of the terms that populate the various metadata fields.

In one embodiment, publisher module 906 of FIG. 5 communicates with lookup module 1206 to determine the canonical terms corresponding to some or all of the terms in metadata records submitted for publication in global metadata index 902. For instance, publisher module 906 may canonicalize submitted terms associated with certain fields (e.g., titles, actors, characters, or any other fields for which canonical terms are maintained) by querying lookup module 1206 using the submitted term as the character string. Canonicalization of terms in various metadata fields facilitates searching in global metadata index 902.

Similarly, when search processor 908 of FIG. 5 receives a search query, it may communicate with lookup module 1206 to canonicalize some or all of the terms appearing in the query. Search processor 908 may also communicate with nomenclature service 140 to perform other related services. For instance, search processor 908 may request terms that are related or similar to query terms. Search processor 908 may use the related or similar terms to improve the relevance of the search results (e.g., by ranking or ordering search hits based in part on presence or absence of related or similar terms). In some embodiments, search processor 908 may also use related or similar terms to provide search assistance, e.g., by returning suggested further queries or prompts intended to resolve ambiguity in the original query (e.g., for a query term "Pirates of the Caribbean®", a prompt might ask whether the user intended the theme-park attraction or the movie). Those skilled in the art will appreciate that where a canonicalized query is used to search a canonicalized global metadata index 902, the likelihood that all relevant results will be returned is increased.

3.6 Other Centralized Services

IMS system 100 may include other centralized services in addition to or instead of those depicted in FIG. 1.

For example, IMS service 100 might provide a centralized digital rights management (DRM) wrapping service that can apply DRM information and/or programs to an asset. DRM information and/or programs can include any information and/or programs designed to prevent unauthorized use or reproduction of the asset. Examples include password protection, encryption, permissions, and any other form of access control information or encoding.

IMS service 100 might also provide additional rights-management services in addition to DRM wrapping. For example, a rights management service may be used to store per-asset rights information. This information can identify, for each registered asset which entities (or groups of entities) are authorized to view the asset or its metadata, to transfer or remove the asset, and so on. This information can be used to control access to assets and metadata on a per-asset basis.

When a client requests an asset (or metadata related to an asset) via IMS bus 102, IMS bus 102 can deliver the request to the rights management service prior to responding to the requesting client. The rights management service accesses its store of per-asset rights information to determine whether the client has the appropriate rights to receive the requested asset or metadata asset and returns appropriate messages authorizing or denying the access to IMS bus 102. This per-asset authorization may be performed in addition to or instead of the entity validation described above with reference to FIG. 4. Per-asset authorization may also be incorporated into other processes, such as the global federated search process of FIG. 11.

In some embodiments, the rights management service may also incorporate aspects of a contract management service. For example, the rights management service may be used to store and track information related to contracts, rights and clearances obtained in the course of creating the asset, such as contracts with actors appearing in a movie, permissions for use of copyrighted material such as songs, and the like. The stored information may include links to the documents and/or electronic copies of the documents as well as metadata (e.g., parties, date of execution, key terms, etc.) describing the various documents. An interface via which clients can search and/or browse rights and clearance information via IMS bus 102 may also be provided.

IMS service 100 might also provide ownership-tracking services. For example, an ownership service can store current ownership information for each asset registered in asset registry 602 (FIG. 6); the ownership information advantageously identifies the business unit that currently owns the asset. If one business unit transfers ownership to another, the ownership-tracking service can be notified of the transfer, either via IMS bus 102 or another interface. The ownership-tracking service may also track ownership history of registered assets, e.g., by updating former owner information for the asset each time a transfer of ownership occurs.

Another centralized service might be a watermarking service usable to identify the origin of a media asset. Digital watermarking allows an owner of a media asset to add hidden verification information (referred to as a "watermark") to the media asset. The watermark may identify the originator or owner of the media asset and/or an entity to which an authorized copy of the asset is being granted. Numerous algorithms for embedding watermark information in an asset are known in the art, and a watermarking service may implement any or all of these techniques. Depending on the particular technique, the watermark might or might not perceptibly alter the media asset. In one embodiment, the watermarking service may be configured to receive requests to add a watermark to a media asset; the request may specify the content of the watermark and/or a particular watermarking algorithm to be used. In some embodiments, the watermarking service may also provide other services related to digital watermarks, including detection, reading and/or validation of watermarks that may be present in a media asset.

One other centralized service might be an accounting service. In some embodiments, IMS system 100 comprises numerous services implemented on computer systems that are supported and maintained by disparate business units within a large organization, and it may be desirable for business units that provide access to their services to be compensated for the expenses associated with supporting and maintaining the connected systems, e.g., in proportion to the use of these systems.

In one embodiment, each connected service provides pricing information to IMS bus 102. IMS bus 102 forwards this information to the centralized accounting service. When IMS bus 102 completes a requested service, IMS bus 102 provides transaction information to the accounting service. The transaction information advantageously identifies the service used, the nature of the service performed (e.g., metadata search, asset transport), and the requesting client (or just the business-unit affiliation thereof). Other information appropriate to the transaction, such as the amount of data transferred, may also be included. Based on the transaction information and the pricing information provided by the service that was used in the transaction, the accounting service determines a transaction price to be charged to the requesting business unit. In some embodiments where IMS bus 102 can select among multiple providers for a requested service, IMS bus 102 may obtain pricing information from the accounting service and use the pricing information in selecting a provider.

In some embodiments, the accounting service maintains an account for each business unit that is debited for transactions in which that business unit's system acts as the requesting client and credited for transactions in which that business unit's system acts as the service provider. In addition to per-transaction costs, the accounting service may charge a periodic "connection fee" for each connected service to cover costs associated with maintaining IMS bus 102; such a fee would be credited to the business unit that maintains IMS bus 102.

Periodically, the accounting service may generate invoices (or checks or other payment instruments) to the various business units based on their current account balances. Alternatively, if the accounting service has direct access, the accounting service may transfer funds from one business unit to another.

Still other centralized services might include rendering and production services usable to create media assets, encoding services and the like. Such services can be specially implemented for IMS system 100, or they can be conventional systems with connector APIs similar to editing service 117 and/or transcoding service 118.

It is to be understood that the various centralized services described herein are illustrative. A particular implementation of a media asset management system in accordance with the present invention may include all, some, or none of these services, and may also include other centralized services not explicitly described herein.

4. Asset Transport Service

The centralized services described above enable disparate connected services to exchange messages related to information about media assets. In general, participating services expect message exchanges via IMS bus 102 to take place synchronously: that is, a system can send a message making a request and wait for a response before taking further action.

Synchronous message-exchange protocols, however, are not well suited to long-running transactions, where minutes, hours, or even days might elapse before the transaction completes. For instance, transfer of a large media asset (e.g., 100 GB or more) from one system to another could take hours or even days, depending on available bandwidth and competing demands for that bandwidth. Thus, in preferred embodiments, actual transfer of assets does not occur through media-bus messages.

Instead, IMS system 100 of FIG. 1 advantageously includes a transport service 150 that manages the transfer of media assets from one connected service to another. In addition to handling long-running transactions, transport service 150 also advantageously provides virtualization that renders transparent various technical details of the actual file transfer, such as file locations, transport protocols, security, firewalls, and the like. The various connected services 114-118 each have a respective transport interface 154-158 that facilitates communication with transport service 150.

Transport service 150 advantageously allows all details of the transport operation to be transparent to senders and recipients. For instance, neither the sender nor the recipient needs to know the location of an asset on the other service, the transport protocol(s) supported by the other service, the security measures in place on the other service, or details of the network connectivity between the two services. All of these details are managed by the transport service, thereby simplifying the asset transfer operation as seen from the user's or service's perspective.

4.1. Interface to Transport Service

Figure 13:
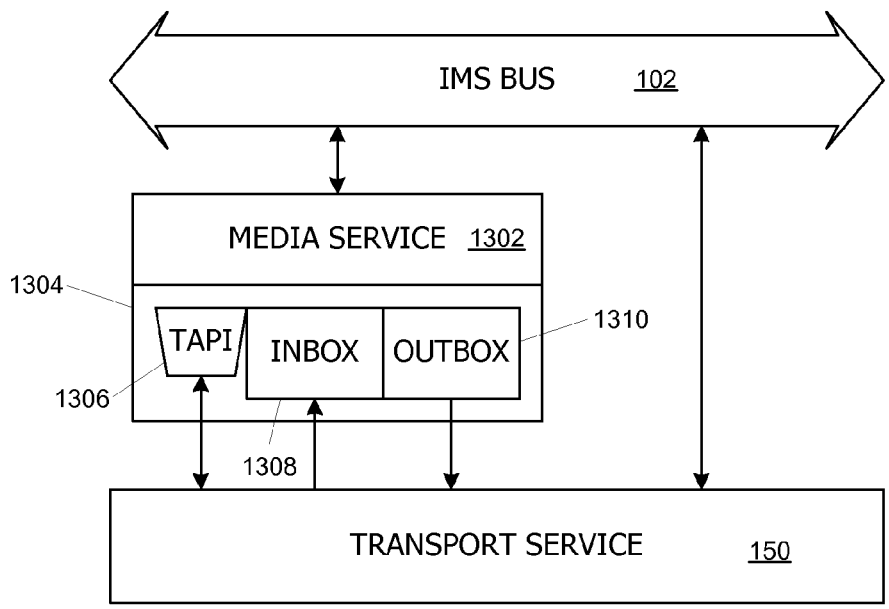
FIG. 13 is a block diagram showing connections of a media service to a transport service adapted to transport media assets according to an embodiment of the present invention.

FIG. 13 is a block diagram showing connections to transport service 150 according to an embodiment of the present invention. For simplicity of illustration, one representative media service 1302 is shown. Media service 1302 can be any service that is connected to IMS bus 102 in the manner described above. It is to be understood that transport interfaces could be provided for any connected service in IMS system 100, including any or all of services 114-118 of FIG. 1.

In this embodiment, a transport interface 1304 includes a transport API (TAPI) 1306, an Inbox 1308 and an Outbox 1310. Transport service 150 defines a transport connector class (similar to the media-bus connector classes described above). The transport connector class specifies the messages that a transport customer (i.e., any service that sends or receives media assets using transport service 150) is expected to generate, recognize, and respond to. The specification advantageously includes message formats, parameters, and corresponding response messages (if any) that are expected. Transport API 1306 implements the transport connector class in a manner appropriate to media service 1302. Transport API converts messages received from transport service 150 into messages that can be understood and acted on by media service 1302; transport API also converts transport-related requests generated by media service 1302 into messages that can be successfully delivered to transport service 150. The messages can include, in particular, messages related to media asset transport transactions but advantageously do not include any media assets.

In one embodiment, message exchange between media service 1302 and transport service 150 is facilitated using IMS bus 102. For example, user validation or other procedures described above can be used to regulate delivery of messages and prevent unauthorized activity. Thus, in some aspects, transport service 150 can be viewed as another centralized service in IMS system 100.

Communication of actual media assets takes place using Inbox 1308 and Outbox 1310. Inbox 1308 and Outbox 1310 are each local storage areas (such as disk space) controlled by media service 1302. Specifically, media service 1302 may have exclusive write access to Outbox 1310 and exclusive read access to Inbox 1308. As the names suggest, Outbox 1310 is used as temporary storage for media assets that are waiting to be transported from media service 1302 to another connected service, while Inbox 1308 is used as temporary storage for media assets that have been transported to media service 1302 from another connected service. Transport service 150 is granted read access to Outbox 1310 and write access to Inbox 1308. In some embodiments, apart from the access rights of media service 1302 and transport service 150 noted herein, no access to Inbox 1308 or Outbox 1310 is granted to any service or entity. Restricting access to Inbox 1308 and Outbox 1310 to the minimum needed for asset transport improves security of the transport operation.

Inbox 1308 and Outbox 1310 are advantageously protected by various security measures, such as firewalls, passwords, encryption of data stored thereon, and so forth. In addition, the particular protocols that can be used to access Inbox 1308 and Outbox 1310 will depend on the particular system on which media service 1302 resides. For instance, the system might support any or all of FTP, SecureTransport™ (a product of Tumbleweed Communications Corp. of Redwood City, Calif.), or other data exchange protocols.

To enable transport service 150 to access Inbox 1308 and Outbox 1310, media service 1302 advantageously provides to transport service 150 a "transport profile" specifying all of the information that transport service 150 requires to read a file from Outbox 1310 and to write a file to Inbox 1308. Transport profile information may include, e.g., designated I/O ports to use for the transaction, cryptographic information (e.g., keys and/or algorithms), any passwords or other access codes that are required, and so on. This information can be formatted into one or more messages for delivery to transport service 150 via transport API 1306. Transport service 150 advantageously maintains a store of transport profiles provided by all of the connected services and accesses stored profiles as needed during transport operations.

4.2. Transport Operation and Waybills

Figure 14:
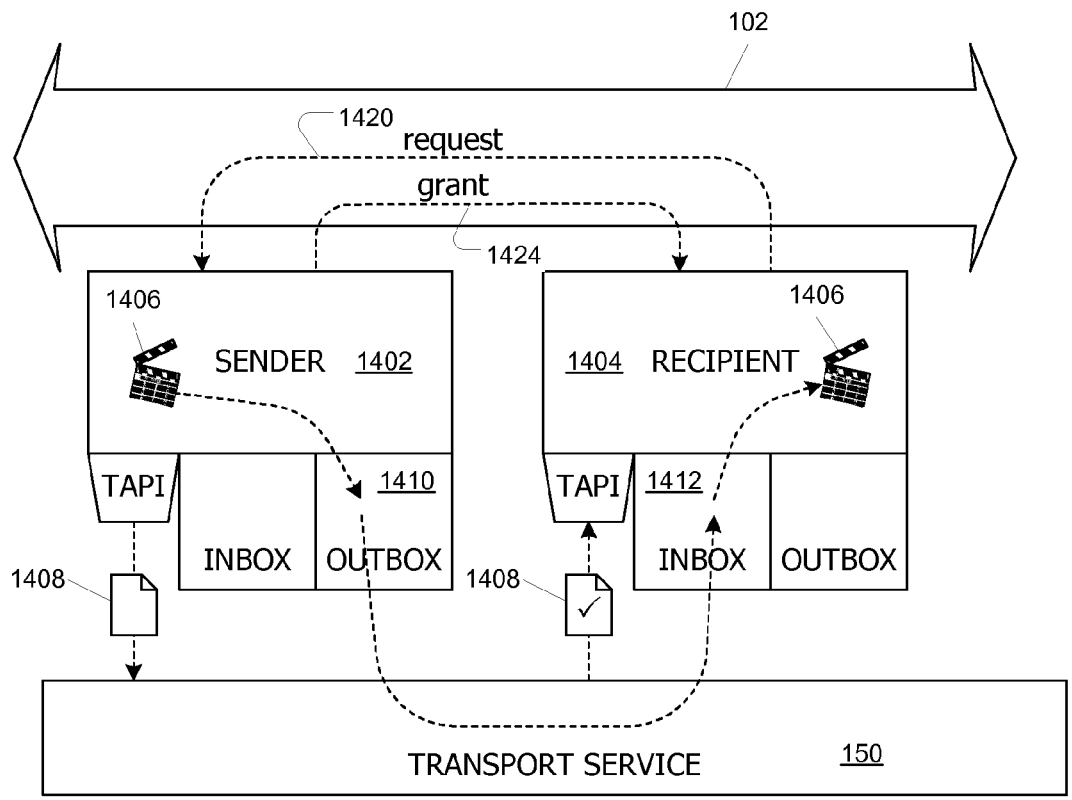
FIG. 14 is a block diagram showing an overview of a transport operation between a sender and a recipient according to an embodiment of the present invention.

FIG. 14 is a block diagram showing an overview of a transport operation between a sender 1402 and a recipient 1404 according to an embodiment of the present invention. Sender 1402 and recipient 1404 exchange messages via IMS bus 102, and a media asset 1406 is transported via transport service 150. Sender 1402 can be any media service that currently stores a media asset 1406. Media asset 1406 may be any digital media file (e.g., video, audio, still image or images, etc.) and may be in any format; in some embodiments, media asset 1406 might be a collection of related media files. Sender 1402 may be any service capable of storing a media file, whether temporarily or long-term. Thus, sender 1402 could be an HSM service, a DAM service, or any other service that provides storage for media assets; sender 1402 could also be a transcoder, editor, or similar media processing service that temporarily stores media assets in connection with processing operations.

Recipient 1404 can be any media service capable of receiving media assets for temporary or long-term storage. Thus, like sender 1402, recipient 1404 could also be an HSM service, a DAM service, any other service that provides storage for media assets, or a media processing service such as a transcoder or editor. Regardless of the particular nature of the media services provided by sender 1402 and/or recipient 1404, all media asset transport advantageously conforms to the same basic pattern.

More specifically, transport is controlled in accordance with a "waybill" 1408. As used herein, a "waybill" can be any data structure that provides a high-level description of a transport operation to be performed; the data structure can be implemented using XML or any other suitable language for representing structured information. The waybill 1408 for a particular transaction is generated by sender 1402 and sent to transport service 150 to initiate a transport operation. Waybill 1408 advantageously accompanies media asset 1406 throughout the transport operation and is ultimately delivered to recipient 1404, along with media asset 1406. During transport, waybill 1408 can be updated to reflect progress of the transport operation.

Figure 15:
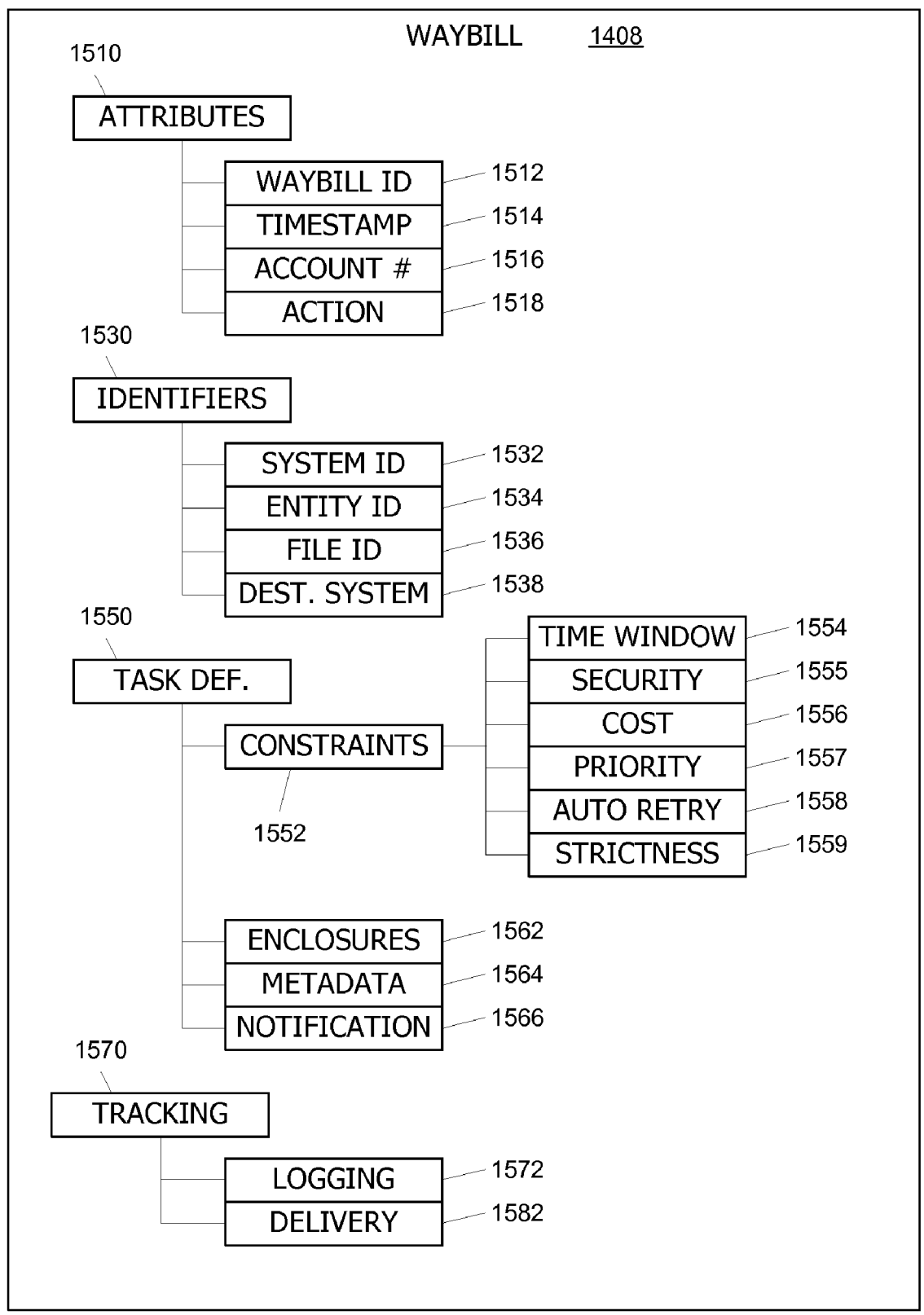
FIG. 15 illustrates data fields for a waybill used in a transport operation according to one embodiment of the present invention.

Waybill 1408 advantageously provides information needed by transport service 150 to manage the transport operation. FIG. 15 illustrates data fields for a waybill 1408 according to one embodiment of the present invention. Waybill 1408 includes four main categories of information: attributes 1510, identifiers 1530, task definition 1550, and tracking 1570.

Attributes category 1510 provides general identifying information for the waybill. A waybill ID 1512 uniquely identifies each waybill being managed by transport service 150. In one embodiment, sender 1402 generates waybill 1408 with a blank waybill ID 1512, and transport service 150 populates waybill ID field 1512 with an automatically generated waybill number (e.g., the next number in a sequence of serial numbers). Timestamp field 1514 stores a timestamp indicating when the waybill was generated by sender 1402. Account number 1516 is supplied by sender 1402 and is used to determine which account is to be charged for any costs associated with the transport operation. This may be the sender's account, the recipient's account, or a third-party account. Account information is useful, e.g., where different business units within the organization are to be charged to cover costs associated with maintaining transport service 150 in proportion to their usage of the service. In other embodiments, account information may be omitted. Action field 1518 is used by sender 1402 to communicate an action to be taken in relation to waybill 1408. In one embodiment, valid actions include "new," "update," and "cancel." Sender 1402 populates action field 1518 with "new" when sending a new waybill 1408 to transport service 150, "update" when revising information in an existing waybill 1408, and "cancel" when instructing transport service 150 to cancel a transport operation associated with waybill 1408.

Identifiers category 1530 includes fields identifying the asset and parties involved in the transport. System ID 1532 identifies the system that originated waybill 1408 (e.g., sender 1402). Entity ID 1534 identifies the particular entity (e.g., user or automated process) that initiated the transport operation. File ID 1536 identifies the location of the asset to be transported. In some embodiments, file ID 1536 will be a reference to a location in Outbox 1410 of sender 1402; the reference may be provided in accordance with a uniform resource identifier format. Destination system 1538 specifies the intended recipient of the asset (e.g., recipient 1404). All fields in identifiers category 1530 are populated by sender 1402 and are not changed by transport service 150.

Task definition category 1550 includes fields defining particulars of the task to be performed. Constraints field 1552 includes various subfields specifying preferred or required delivery constraints; these subfields are usually populated by sender 1402. For example, time window field 1554 can be used to specify an earliest time and/or latest time at which the asset should be delivered. Security field 1555 can be used to specify whether the file should be encrypted for transmission. Cost field 1556 can be used to specify estimated costs (as determined by transport service 150) and/or an upper limit on the amount that sender 1402 (or other payer) is willing to pay for the transport operation. Priority field 1557 can be used to define a priority level (e.g., high, normal or low) for the transport operation. Auto retry field 1558 can be used to indicate whether transport service 150 should automatically retry the transport operation in the event of failure. Strictness field 1559 can be used to store one or more flags (e.g., Boolean values) indicating whether any or all of the constraints are to be strictly observed, where "strictly observed" means that the transport operation is not to be performed if the constraint is violated. Constraints that are not strictly observed are treated as preferences, and transport service 150 violates them only to the extent necessary to complete the operation. In one embodiment, strictness is set globally for all delivery constraints; in another embodiment, a strictness flag can be sent separately for each constraint.

Task definition category 1550 also includes other fields that provide optional information related to the transport operation to be performed. For instance, enclosures field 1562 can be used by sender 1402 to enclose a message to recipient 1404. The message can contain any information that sender 1402 desires to provide and may be in any format that recipient 1404 is capable of reading. The content of enclosures field 1562 remains in waybill 1408 throughout the transport operation but is not read by transport service 150. Metadata field 1564 is used to add information descriptive of the asset to waybill 1408. In one embodiment, the asset's file type and size are required metadata; other metadata (e.g., file name, compressibility) may be optional. In principle, metadata field 1564 or enclosures field 1562 could be used to transport any of the asset's metadata along with the asset; however, it may be preferable to transfer metadata using messages exchanged via IMS bus 102 as described above. Notification field 1566 includes a list of connected services and/or entities ("interested parties") that should be notified of transport-related events. In one embodiment, for each interested party, notification field 1566 may include information indicating the particular events that should trigger a notification.

Fields in task definition category 1550 are initially populated by sender 1408. Transport service 150 reads these fields (except enclosure field 1562) as needed prior to and during transport. In some embodiments where cost field 1556 includes estimated costs, transport service 150 may populate that field when it generates the initial cost estimate as described below.

Tracking category 1570 includes fields used by transport service 150 to log information about the transport and ultimate delivery of the asset. For instance, logging field 1572 can be used to provide a detailed record of how the asset was handled in transit, such as when it was removed from sender's Outbox 1410, which specific system (or systems) handled the asset during transport, whether any errors were detected, and the like. In some embodiments, transport service 150 may compute a checksum or other information that can be used to verify data integrity, and this information can be included in logging field 1572.

Delivery field 1582 provides information regarding the final delivery of asset 1406 to inbox 1412 of recipient 1404. In one embodiment, the final delivery information includes a timestamp and a final cost determined by transport service 150.

4.3. Transport Service Implementation

Figure 16:
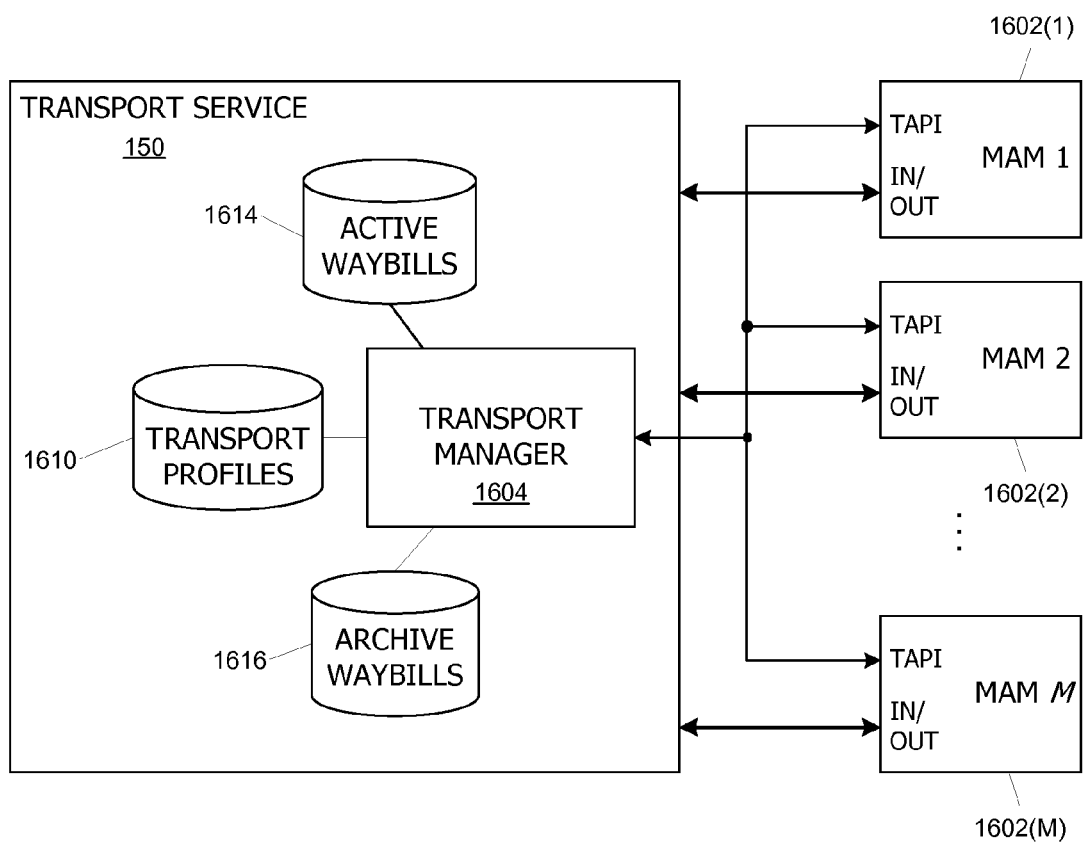
FIG. 16 is a block diagram of a media asset transport service according to an embodiment of the present invention.

FIG. 16 is a block diagram showing additional details of transport service 150 according to an embodiment of the present invention. A number M of media services 1602(1) to 1602(M) are connected to transport service 150 as shown. Media services 1602(1) to 1602(M) may be any services capable of connecting to IMS bus 102, including but not limited to services 114-118 described above.

In some embodiments, transport service 150 is implemented as one or more computer programs (software) executing on one or more appropriately configured computer systems (such as server platforms of generally conventional design). Transport manager 1604 may be implemented on a single computer system or distributed across multiple computer systems, e.g., in a server farm or mirrored server configuration. Transport service 150 may be configured to handle multiple different transfer protocols, encryption schemes, etc.

As shown in FIG. 16, each media service 1602(1) to 1602(M) has a direct connection to transport service 150, allowing transport service 150 to read from the Outbox and/or write to the Inbox of the media asset service without going through an intermediary. These connections enable transport service 150 to ingest files from and deliver data to a particular media service 1602. It should be noted that where transport service 150 is implemented across multiple computer systems, different ones of these systems may directly connect to different media services 1602.

Transport manager 1604 maintains a number of data stores, including a transport profiles data store 1610, an active waybill store 1614, and an archival waybill store 1616. Transport profiles data store 1610 stores the transport profile supplied by each media asset service 1602(1) to 1602(M) as described above. Active waybill store 1614 maintains waybills for transport operations that are in progress or not yet begun, while archival waybill store 1616 maintains a record of waybills for completed transport operations.

In operation, transport manager 1604 communicates with the transport APIs of each media asset service 1602(1) to 1602(M) to receive and deliver waybills and other information. In the example shown in FIG. 14, sender 1402 delivers a waybill to transport service 150 to set up a transport transaction for asset 1406; that waybill is received by transport manager 1604 of FIG. 16. Based on information in waybill 1408 and information in transport profiles data store 1610, transport manager 1604 determines the details of the transport operation, including protocols to be used, any necessary file format conversions, and the like. Transport service 150 then conducts the transport operation as determined by transport manager 1604.

4.4. Transport Process

Figure 17A:
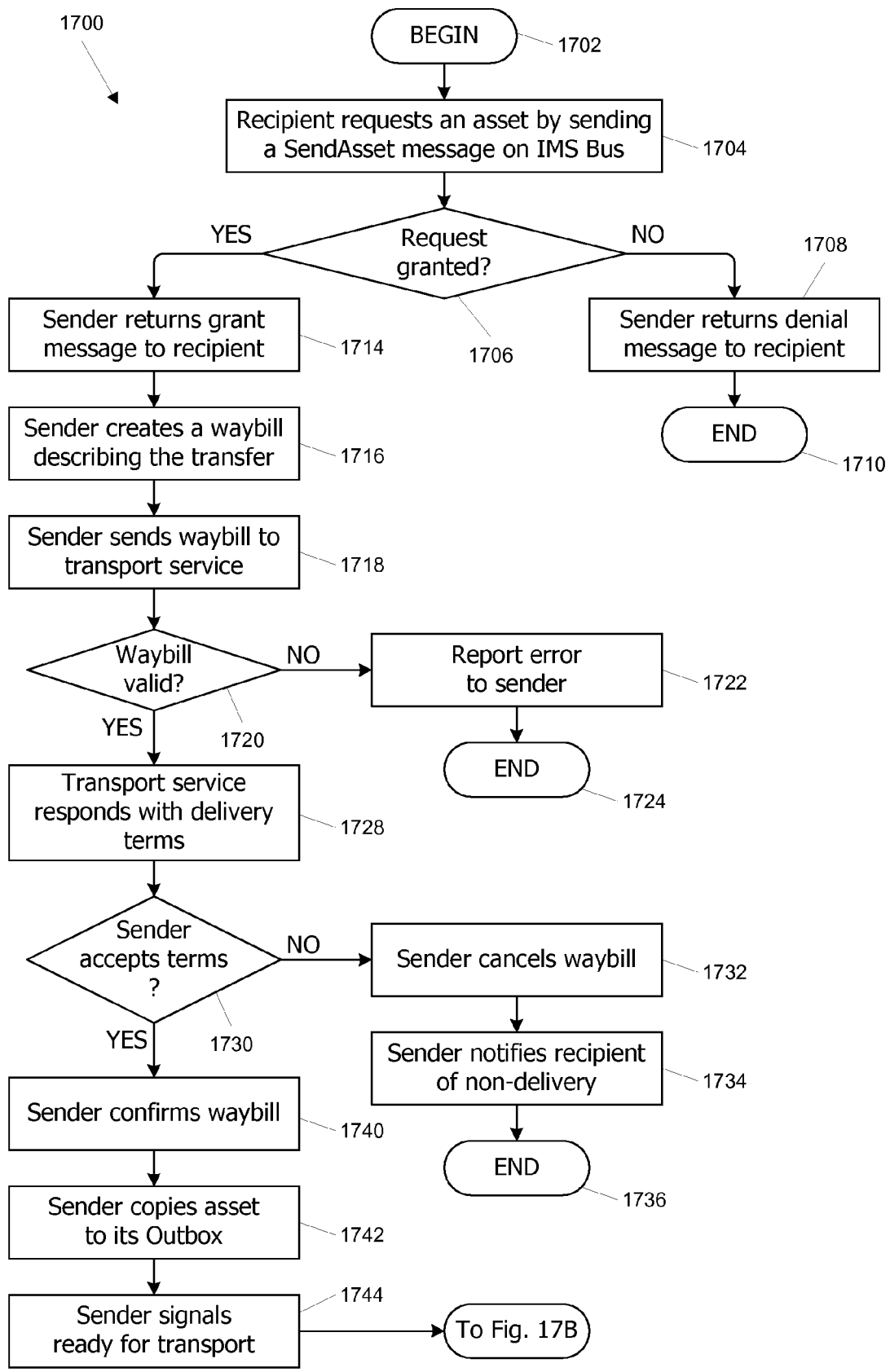
FIGS. 17A-17B are a flow diagram of a process for transporting a media asset using a transport service according to an embodiment of the present invention.
Figure 17B:
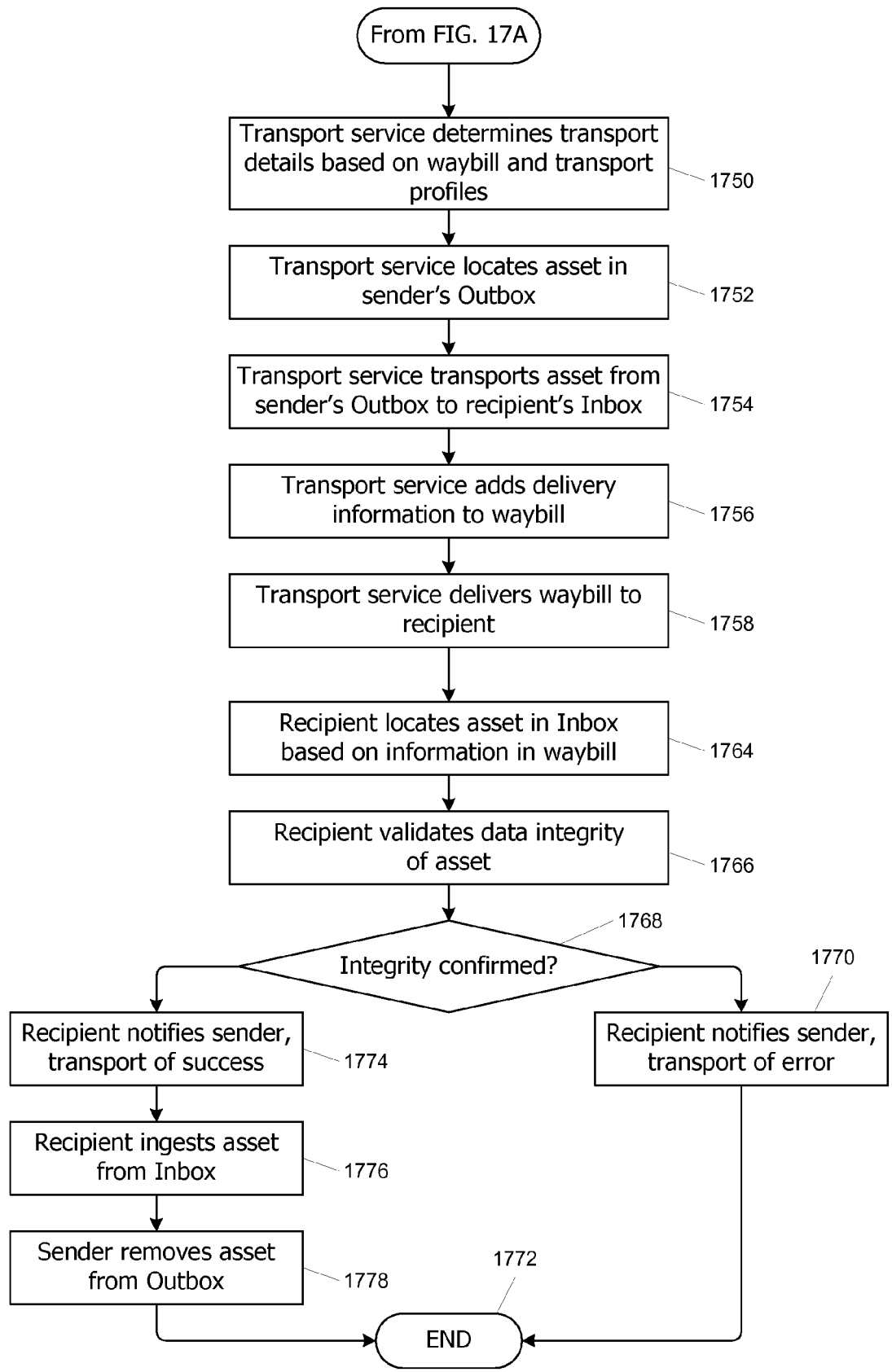

A further understanding of a transport operation can be had with reference to FIGS. 17A-17B, a flow diagram of a process 1700 for transporting a media asset (e.g., asset 1406 of FIG. 14) using transport service 150 shown in FIG. 16 according to an embodiment of the present invention. In this example, sender 1402 sends asset 1406 in response to a request for asset 1406 made by recipient 1404 (e.g., using the SendAsset message described above with reference to FIG. 2).

Referring first to FIG. 17A, process 1700 begins (step 1702) when recipient 1404 sends a request message 1420 via IMS bus 102 to sender 1402 (step 1704). Request message 1420 requests transfer of media asset 1406, which sender 1402 is currently storing. At step 1706, sender 1402 decides whether to grant the request. If sender 1402 does not grant the request, then at step 1708, sender 1402 returns a denial message to recipient 1404 via IMS bus 102, and process 1700 ends (step 1710).

If, at step 1706, sender 1402 decides to grant the request, then at step 1714, sender 1402 returns a grant message 1422 to recipient 1404 via IMS bus 102 to confirm that sender 1402 will undertake to transfer media asset 1406. Sender 1402 then generates (step 1716) a new waybill 1408 describing the transfer. Creating waybill 1408 may include, e.g., populating the fields in identifiers category 1530 and task definition category 1550 and inserting a timestamp 1514 and account number 1516 in attributes category 1510. Sender 1402 sends the new waybill 1408 to transport service 150, in particular to manager 1604 of FIG. 16 (step 1718).

At step 1720, transport manager 1604 validates the new waybill 1408. Validating may include testing the validity or internal consistency of any or all information included in waybill 1408. For instance, manager 1604 may check transport profiles data store 1312 (FIG. 13) to verify that it has transport profiles for sender 1402 and recipient 1404. Manager 1604 may also determine whether the system ID in field 1532 corresponds to the file identifier 1536 to verify that waybill 1408 originated from the service currently in possession of the media asset to be transferred. Other validity tests may also be performed at step 1720. If waybill 1408 is determined to be invalid, manager 1604 reports an error to sender 1402 at step 1722, and process 1700 ends (step 1724).

If, at step 1720, waybill 1408 is successfully validated, then at step 1728, manager 1604 responds to sender 1402 with proposed delivery terms. The terms may include, e.g., estimated cost, expected date and/or time of delivery, security measures to be used, etc. In one embodiment, the delivery terms are presented by modifying constraints 1552 in waybill 1408 and returning waybill 1408 to sender 1402 for approval.

At step 1730, sender 1402 reviews the terms and decides whether to accept them. Depending on implementation, step 1730 may include user approval and/or automatic decision procedures. If sender 1402 rejects the terms, then at step 1732, sender 1402 cancels the new waybill 1408, e.g., by modifying action field 1518 to include the "cancel" action and returning the modified waybill 1408 to transport manager 1604. At step 1734, sender 1402 may notify recipient 1404 that the asset will not be transported, and process 1700 ends (step 1736). In response to a notification of non-transport, recipient 1404 may take appropriate action, such as renewing the request (which would restart process 1700 from step 1702) or seeking to obtain the asset through an alternative channel.

If, at step 1730, sender 1402 accepts the proposed delivery terms, then at step 1740, sender 1402 confirms waybill 1408 with transport manager 1604, e.g., by modifying action field 1518 to include the "update" action and returning the modified waybill 1408 to transport manager 1604. At step 1742, sender 1402 copies asset 1406 to its Outbox 1410. (In an alternative embodiment, asset 1406 might be copied to Outbox 1410 at an earlier stage.) At step 1744, sender 1402 signals transport service 150 that asset 1406 is ready for transport.

Thereafter, transport service 150 begins the transport operation. It is to be understood that the transport operation can be delayed for an arbitrary length of time depending on the terms negotiated between sender 1402 and transport service 150. As shown in FIG. 17B, when the transport operation is ready to begin, at step 1750 transport service 150 (e.g., manager 1604) determines parameters for the transport operation. In one embodiment, transport manager 1604 determines the transport parameters based on information in waybill 1408 and information in its data stores. For instance, the respective transport profiles of sender 1402 and recipient 1404 as stored in transport profiles database 1312 may be used to identify respective protocols for accessing the sender's Outbox 1410 and a protocol for accessing the recipient's Inbox 1412. Given this information, transport manager 1604 determines the details of the transport operation, such as how to access sender's Outbox 1410 to extract the asset (e.g., a file), how to access recipient's Inbox 1412 to deliver the asset, whether any format conversions are needed, and the like.

At step 1754, the transport operation is executed, and asset 1406 is transported from sender's Outbox 1410 to recipient's Inbox 1412.

At step 1756, once asset 1406 has reached recipient's Inbox 1412, transport service 150 adds delivery information 1582 to waybill 1408. At step 1758, waybill 1408 is delivered to recipient 1404. In some embodiments, transport service 150 stores a copy of the completed waybill 1408 in archival waybill store 1616 for logging and/or billing purposes. (For instance, an accounting service could process each completed waybill 1408 by extracting the actual cost of the transport operation from delivery information 1582 and charging that cost to the account number identified in field 1516.)

Receipt of waybill 1408 notifies recipient 1404 that asset 1306 has arrived. At step 1764, recipient 1404 locates asset 1306 in its Inbox 1412 based on information in waybill 1408. At step 1766, recipient 1404 may verify the asset's integrity, e.g., by computing a checksum for asset 1406 and comparing the computed checksum to a checksum recorded in waybill 1408 (step 1768). If the asset's integrity cannot be confirmed, e.g., if the checksums do not match, recipient 1404 notifies sender 1402 and transport service 150 of an error (step 1770), and process 1700 ends (step 1772).

If, at step 1768, the asset's integrity is confirmed, then at step 1774 recipient 1404 notifies sender 1402 and transport service 150 of successful completion. At step 1776, recipient 1404 ingests asset 1406 from its Inbox 1412. Ingestion may include, e.g., adding the asset to a temporary or long-term storage system local to recipient 1404, streaming the asset to a playback component, or the like. At step 1778, having been notified of successful delivery, sender 1402 removes the copy of asset 1406 from its Outbox 1410. Sender 1402 may also delete its local copy of asset 1406 once successful delivery has been confirmed. Waiting for delivery confirmation before deleting the sender's local copy assures that assets will not be lost in transit between connected services; in the event of transport failure or error, the asset simply remains with sender 1402, and the transport operation can be retried if desired.

It will be appreciated that the transport service and processes described herein are illustrative and that variations and modifications are possible. Process steps described as sequential may be executed in parallel, order of steps may be varied, and steps may be modified or combined. The transport service, or a particular transport operation, may include intermediate steps. A copy of the waybill may accompany the asset during transport, or the transport manager can maintain and update the waybill in the active waybill store during the transport operation. The transport manager may also be configured to provide status updates to the sender, the recipient, or other interested parties (either automatically or in response to requests) at various points during the transport operation. Waybills may include any data that is useful or necessary to complete a transport operation.

It should be noted that the transport service described herein advantageously allows all details of the transport operation to be transparent to senders and recipients. For instance, neither the sender nor the recipient needs to know the location of an asset on the other service, the transport protocol(s) supported by the other service, the security measures in place on the other service, or details of the network connectivity between the two services. All of these details are managed by the transport service, thereby simplifying the asset transfer operation as seen from the user's or service's perspective. The sender can simply provide a waybill specifying the asset to be transported and its intended recipient, as well as any constraints the sender chooses to impose; the transport service determines the details needed to execute the operation, transparently to both the sender and the recipient.

5. Orchestration Service

Those skilled in the art will recognize that IMS system 100 is capable of supporting a wide range of media management functions. Any number of connected services can be coordinated to execute complex (multi-step) transactions.

Figure 18:
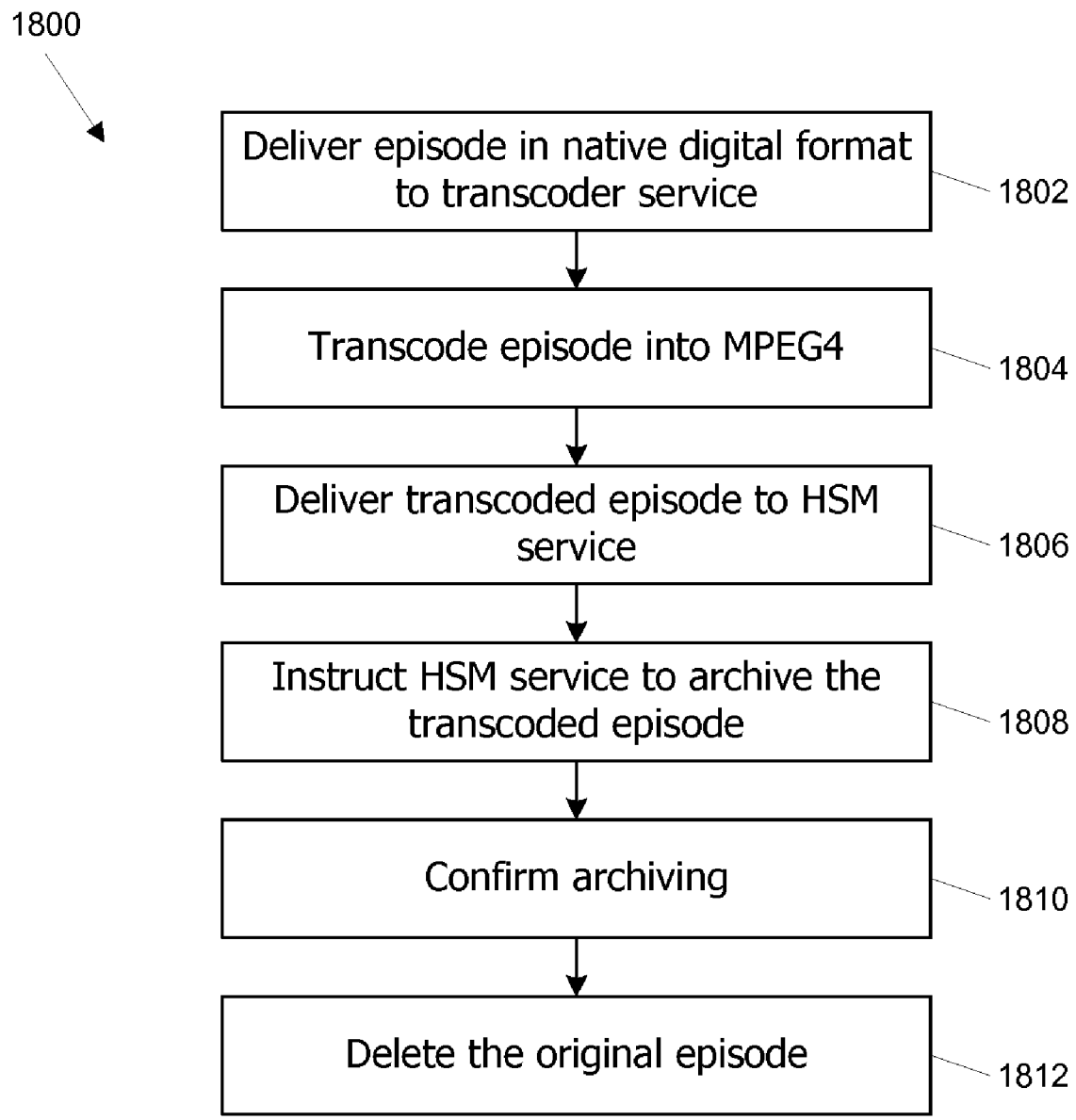
FIG. 18 is a flow diagram of a complex transaction that might be performed using an IMS system according to an embodiment of the present invention.

By way of example, FIG. 18 is a flow diagram of a complex transaction 1800 that might be performed using IMS system 100. Complex transaction 1800 might be used by a business unit such as a production company that produces weekly episodes of a television series. It is assumed that each weekly episode is initially loaded onto a DAM service (e.g., service 114 of FIG. 1) under control of the production company. The episode loaded onto DAM service 114 is a media asset in a digital file format such as a native digital format. This asset can be managed using any of the media management services described above. For example, in complex transaction 1800, the episode is archived using an HSM service (e.g., service 116 of FIG. 1) in a different format (e.g., MPEG-4 with parameters suitable for high-definition TV broadcasts).

More specifically, at step 1802, DAM service 114 sends an episode to a transcoder service such as transcoder service 118 of FIG. 1. At step 1804, transcoder service 118 transcodes the episode into the desired format for archiving. At step 1806, transcoder service 118 sends the episode to HSM service 116, and at step 1808, HSM service 116 is instructed to archive the transcoded episode (e.g., to robotic tape drive). At step 1810, HSM service 116 confirms that the episode has been archived, after which DAM service 114 can delete the original episode (step 1820).

Setting up complex transaction 1800 entails programming a sequence of transactions within IMS system 100. Further complicating the programming is that some of the transactions are synchronous while others are asynchronous. For example, sending the episode to transcoder service 118 at step 1802 might involve a SendFormats or SendTemplates message from DAM service 114 to transcoder service 118; transcoder service 118 responds with a list of formats or predefined job templates. DAM service 114 uses this information to create parameters for an eventual SubmitJob message to transcoder service 118. The job, however, cannot be submitted until after the file to be transcoded has been delivered to transcoder service 118. Accordingly, DAM service 114 next communicates with transport service 150 to negotiate and initiate a file transport operation. The negotiation may be synchronous, but the actual transport operation is conducted asynchronously. As a result, DAM service 114 must be configured to receive an asynchronous notification when the transport operation is complete, so that it can send the SubmitJob message to transcoder service 118 at the right time. Similarly, instructions to HSM service 116 need to be correlated with delivery of the transcoded episode thereto, and this requires additional notification messages so that synchronous communications are properly timed.

In some embodiments of the present invention, management of complex transactions is accomplished using orchestration service 160 of FIG. 1. Orchestration service 160 advantageously allows users to define transactions of arbitrary complexity as "IMS workflows." Once an IMS workflow has been defined, the user can execute the IMS workflow by sending an appropriate message to IMS bus 102.

Figure 19:
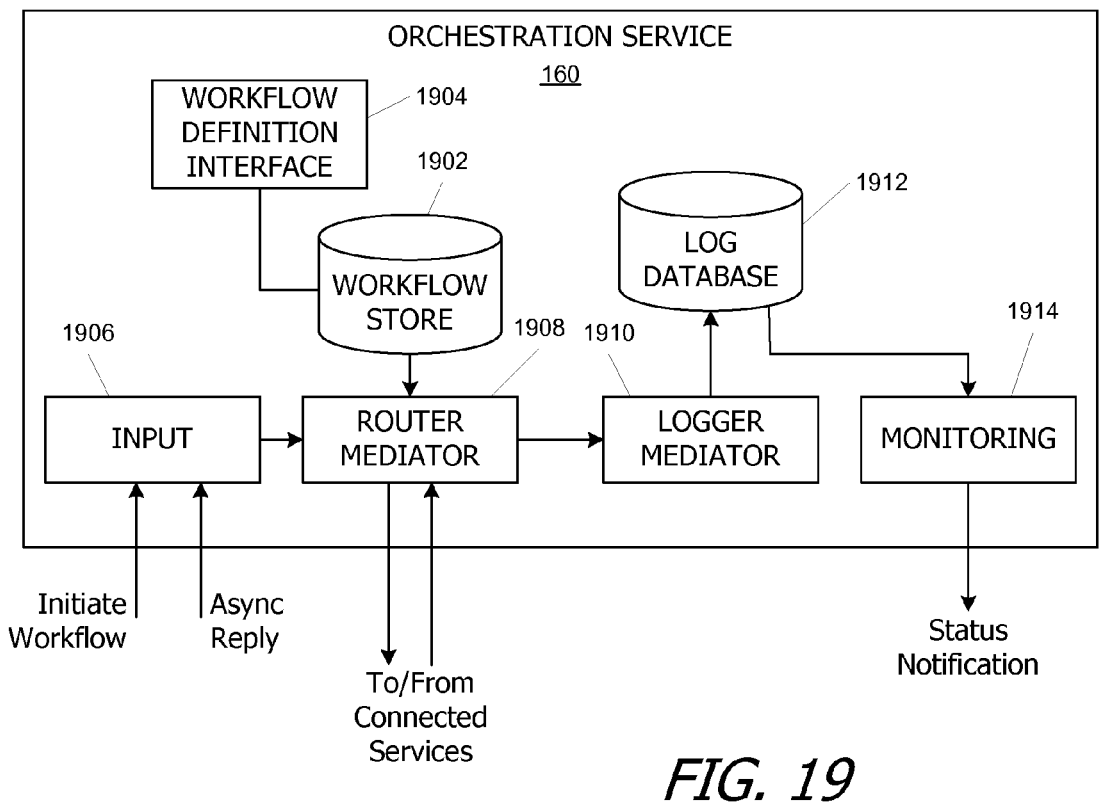
FIG. 19 is a block diagram of an orchestration service for managing complex transactions according to an embodiment of the present invention.

FIG. 19 is a block diagram of orchestration service 160 according to an embodiment of the present invention. Orchestration service 160 includes a workflow database 1902 that stores IMS workflows that have been defined by users of IMS system 100.

A workflow definition interface 1904 advantageously provides an easy-to-use interface for defining IMS workflows. In one embodiment, workflow definition interface 1904 is a graphical tool that assists a user in creating IMS workflows by providing a palette of connected services (or functionality) and a palette of connectors for relating different services in the IMS workflow. Connectors advantageously allow the user to add control flow information, such as fork/join, conditional execution (e.g., if-then-else), and branching, to the IMS workflow definition. Thus, for instance, a user might specify a "fork" when an asset is to be transferred to two different recipient services, an "if" when an action to be performed depends on some parameter (e.g., size of asset, time, etc.), and so on. In some embodiments, the user can build IMS workflows by dragging and dropping icons from the appropriate palettes, then save the IMS workflow to IMS workflow database 1902. In addition, previously defined IMS workflows from workflow database 1902 may be provided as available functionality that can be integrated into other IMS workflows, enabling the user to build up IMS workflows of arbitrary complexity in a relatively intuitive manner. Workflow definition interface 1904 may also allow users to view and modify existing IMS workflow definitions from database 1902.

In some embodiments, IMS workflows may involve any or all of the connected services in an IMS system, including but not limited to media services 114-118 and/or connected services 132-140 and/or transport service 150 shown in FIG. 1. In some cases, an IMS workflow may specify that human intervention is required at any stage. For example, someone in the organization may need to authorize a particular transfer or inspect a result of an operation or the like. Human intervention can be incorporated into an IMS workflow by inserting a notify-user function into the IMS workflow at the appropriate point. The notify-user function may be performed, e.g., by sending an e-mail or instant message to the appropriate user(s) and waiting for a response. The message advantageously identifies the nature of the action required and an appropriate channel for response. In one embodiment, an IMS workflow identifies the recipients of such a message by reference to a role within the organization, rather than by individual identifiers such as names or user IDs. Mappings of users to roles may be supplied by entity registry service 132 of FIG. 1 or another suitably-configured centralized service. Where users to be notified are identified by their roles, IMS workflows need not be edited every time a user leaves the organization or roles within the organization are reassigned.

IMS workflows may also specify conditions under which status notifications are to be sent to various interested parties. Interested parties may include any connected service and/or individual user (defined, e.g., by user ID or organizational role). A status notification is a message that apprises its recipients of the status of the IMS workflow. For instance, a status notification (e.g., a ReceiveNotification message as described above with reference to FIG. 2, an e-mail message, or other message) may be used to indicate that some point of interest in the IMS workflow has been successfully reached or that an error has occurred. No reply to a status notification is required or expected.

For execution of IMS workflows, orchestration service 160 includes an input module 1906, a router mediator 1908, a logger mediator 1910 that communicates with a logging database 1912, and a monitoring module 1914. Input module 1906 can include an input port that receives messages from connected services instructing orchestration service 160 to initiate an IMS workflow, with the name of the IMS workflow being specified in the message. Input module 1906 may also receive asynchronous reply messages from connected services during the course of executing an IMS workflow. For example, a notification that transport is complete is an asynchronous reply message generated by transport service 150 as described above. For transport operations initiated during IMS workflow execution by orchestration service 160, orchestration service 160 is advantageously identified to transport service 150 as an interested party (e.g., by populating field 1566 of waybill 1408 of FIG. 15 described above). Transport service 150 would deliver the notification to orchestration service 160 at input module 1906.

Router mediator 1908 handles all incoming messages, including IMS workflow initiation messages and asynchronous reply messages received via input module 1906 as well as synchronous response messages that are sent directly to router mediator 1908. Router mediator 1908 advantageously maintains a queue of incoming messages that await processing as well as a queue of outgoing messages to be transmitted to various connected services. Messages can be processed in FIFO (first-in, first-out) order, or prioritization logic can be used to allow faster attention to high-priority messages.

In one embodiment, router mediator 1908 executes all IMS workflows. In response to an IMS workflow initiation message, router mediator 1908 retrieves the IMS workflow from database 1902 and creates a workflow context that tracks the status of this instance of the IMS workflow. Based on the IMS workflow, router mediator 1908 determines the first message to be sent and sends that message. When a response (which may be synchronous or asynchronous without limitation) is received, router mediator 1908 updates the workflow context and determines the next message to be sent for that IMS workflow based on the response that was received. It is to be understood that router mediator 1908 may maintain numerous concurrent workflow contexts, allowing multiple IMS workflows to be executed concurrently.

Router mediator 1908 in some embodiments reports all incoming and outgoing messages to logger mediator 1910. Logger mediator 1910 maintains a log database 1912 of messages associated with each executing IMS workflow. In addition to current IMS workflows, log database 1912 may include an archive of any number of past IMS workflow executions.

Monitoring module 1914 reads log database 1912 to detect events and generate appropriate status notifications to interested parties (e.g., connected services and/or individual users or groups of users). In some embodiments, monitoring module 1914 also provides an interface via which users or automated processes can query log database 1912 to obtain updates on current IMS workflow status and/or to review information related to past IMS workflow executions.

Where an IMS workflow specifies human intervention, a message may be sent to the appropriate personnel through e-mail, instant messaging, voice mail, pager services, or the like. Such messages can be automatically generated and sent from routing module 1908 of orchestration service 160. The message advantageously identifies the nature of the response required and an appropriate channel for response (e.g., an e-mail reply to a specific address, a clickable link to a response page, or other suitable channels). In one embodiment, an IMS workflow identifies the recipients of such a message by reference to a role within the organization, rather than by individual identifiers such as names or user IDs. As noted above, mappings of users to roles may be supplied by user registry service 132 of FIG. 1; during IMS workflow execution, routing module 1908 advantageously accesses this mapping information to identify one or more users corresponding to a role specified in an IMS workflow. Messages to human users are advantageously treated as asynchronous; as with other asynchronous messages, the reply is received via input module 1906 and forwarded to routing module 1908 for processing.

Orchestration service 160 can be implemented, e.g., as one or more computer programs executing on a suitably configured computer system such as a server. The various programs may execute on the same server as IMS bus 102 or one or more other servers. The orchestration service can be implemented on a single system or distributed across multiple systems e.g., a server farm or the like.

Figure 20:
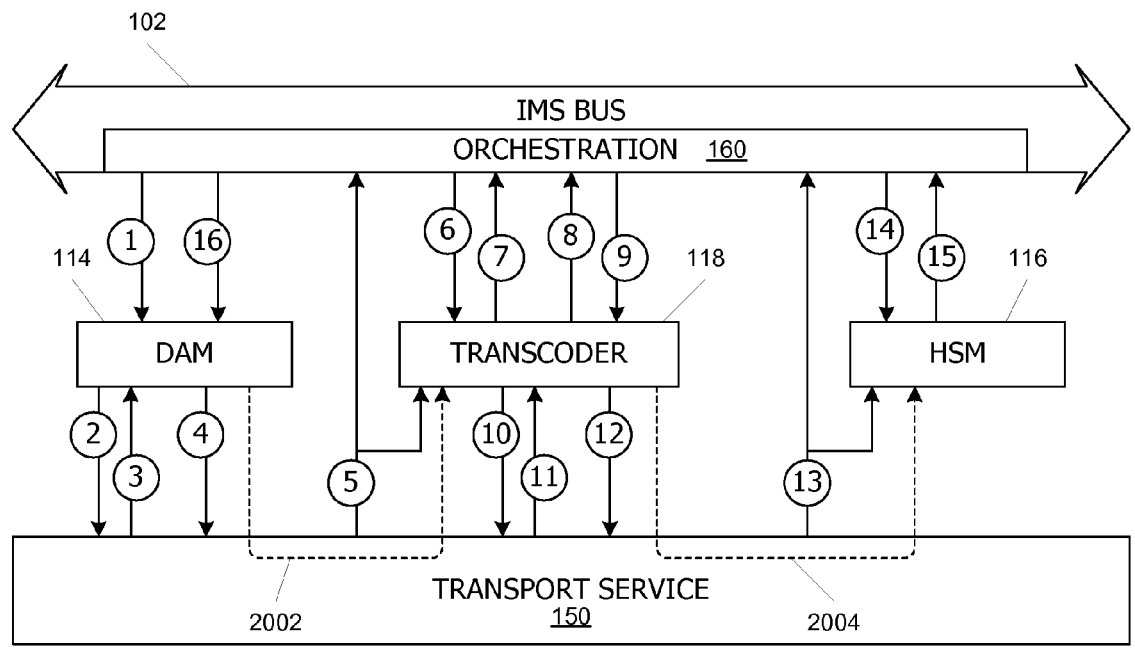
FIG. 20 is a message-passing diagram that further illustrates operation of an orchestration service according to an embodiment of the present invention.

FIG. 20 is a message-passing diagram that further illustrates operation of orchestration service 160 according to an embodiment of the present invention. FIG. 20 identifies some of the messages that would be sent within IMS system 100 during execution of complex transaction 1800 of FIG. 18. In FIG. 20, messages correspond to numbered circles. Only messages that are part of the IMS workflow are shown; thus, for instance, the initial message to FIG. 20 that resulted in launching of the IMS workflow and status messages sent by monitoring module 1914 of FIG. 19 to interested parties are not shown. Also not shown are synchronous response messages that merely confirm receipt of a message.

The IMS workflow begins with message 1 from orchestration service 160 to DAM service 114, instructing DAM service 114 to initiate a transfer of the asset (e.g., an episode of a television series) to transcoder service 118. In this case, the IMS workflow specifies transcoder service 118 as the destination; in other instances, orchestration service 160 might send messages (e.g., SendTemplates or SendFormats messages as described above with reference to FIG. 2) to dynamically identify a transcoder service capable of performing the transcoding operation specified in the IMS workflow.

Message 2 is sent by DAM service 114 to transport service 150 to request transport of the asset. The transport operation follows the steps described above with reference to FIGS. 17A-17B: Transport service 150 proposes delivery terms with message 3, and DAM service 114 accepts the terms with message 4. Thereafter, the asset is transported (dotted line 2002). On completion, transport service 150 notifies orchestration service 160 via message 5; message 5 may also be delivered to transcoder service 118.

In response to message 5 from transport service 150, orchestration service 160 generates message 6 to transcoder service 118. Message 6 is a SubmitJob message that can specify job parameters or a template to be used, as described above with reference to FIG. 2. Transcoder service 118 confirms the job with message 7 and executes the job, then generates message 8 to notify orchestration service 160 that the job is complete.

In response to message 8, orchestration service 160 generates message 9 instructing transcoder service 118 to transport the transcoded asset to HSM service 116. Transcoder service 118 negotiates with transport service 150 (messages 10 and 11) and initiates transport with message 12. The asset is transported (dotted line 2004). Upon completion of the transport, transport service 150 notifies orchestration service 160 via message 13, which may also be delivered to HSM service 116.

In response to message 13, orchestration service 160 generates message 14 instructing HSM service 116 to archive the asset. HSM service 116 confirms completion of the archival transfer with message 15. Upon receipt of message 15, orchestration service 160 sends message 16 to DAM service 114, confirming the completion and instructing DAM service 114 to delete the original episode. (Human intervention may be required to delete the episode.)

It is to be understood that FIG. 20 is merely an illustration. Any IMS workflow can be defined according to the general principles illustrated herein, and IMS workflows can include locating assets; transferring or distributing assets; creating, modifying or deleting assets; updating asset metadata; and any other functionality provided by any service within IMS system 100. In some embodiments, IMS workflows can be scheduled for automatic execution on a one-time or recurring basis, and orchestration service 160 may include a scheduler configured to automatically submit IMS workflows to router mediator 1908 at the scheduled times. Alternatively or additionally, some IMS workflows may be automatically initiated in response to an event detected on IMS bus 102. As noted above, IMS bus 102 provides event detection and notification capability, and orchestration service 160 may be notified of certain events, e.g., via messages to input module 1906. Such messages may trigger launching of an IMS workflow by orchestration service 160. Thus, orchestration service 160 enables a high degree of automation and seamless integration of media-related processes across the organization.

6. Further Embodiments

While the invention has been described with respect to specific embodiments, one skilled in the art will recognize that numerous modifications are possible. For instance, while the embodiments described above may make reference to specific hardware and software components, those skilled in the art will appreciate that different combinations of hardware and/or software components may also be used and that particular operations described as being implemented in hardware might also be implemented in software or vice versa. Additionally, while various services and operations are described herein with reference to particular modules, it is to be understood that the modules are defined for convenience of description and are not intended to imply a particular physical arrangement of component parts. Further, the modules need not correspond to physically distinct components; for instance, a single software program may incorporate any number of modules or aspects thereof.

Computer systems usable to implement embodiments of the present invention may be of conventional design and may include standard components such as disk drives, CD-ROM drives, network interface components, and the like. Where a user interface is provided, conventional user input/output devices such as keyboards, mice and monitors are advantageously available. More generally, computers capable of communicating with an IMS bus can be configured with many different hardware components and can be made in many dimensions and styles (e.g., laptop, tablet PC, personal digital assistant, smart phone, server, workstation, mainframe). Network connections among various computer systems may be provided via any suitable transport media (e.g., wired, optical, and/or wireless media) and any suitable communication protocol (e.g., TCP/IP). A "server" as used herein refers generally to any computer system that is providing information to another machine or process ("client") that requests the information. In this respect, a computer or process can be acting as a client at one point in time (in the sense that it is requesting information) and can be acting as a server at another point in time (in the sense that it is providing information).

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device, or the program code may be provided separately from other devices (e.g., via Internet download).

Connected media applications and services may be under control of different business units in the same organization. In addition, media applications and services under control of different organizations might also be connected to an IMS bus. For example, a television network (or station) and a production company that supplies media content to that television network might be connected via an IMS bus.

Thus, although the invention has been described with respect to specific embodiments, it will be appreciated that the invention is intended to cover all modifications and equivalents within the scope of the following claims.

What is claimed is:

1. A system comprising:
a plurality of local computer systems, each local computer system adapted to operate a respective media service, each media service having a connector associated therewith, each connector being adapted to translate messages between a local protocol specific to the media service and a common protocol;
at least one centralized computer system adapted to operate at least two centralized services and to send and receive messages related to the at least two centralized services using the common protocol, wherein the at least two centralized services include a nomenclature service adapted to define and enforce standard nomenclature across the plurality of media services; and
an interoperable media services bus communicably coupled to each of the plurality of media services and to the at least two centralized services, the interoperable media services bus being adapted to support an exchange of messages between the media services and the centralized services according to the common protocol;
wherein the interoperable media services bus is further adapted to route a first request message related to a first one of the at least two centralized services from any one of the media services to the first centralized service for processing, the routing being transparent to the one of the media services,
wherein the first centralized service is further adapted to generate a second request message based on the first request message and to send the second request message to the interoperable media services bus, and
wherein the interoperable media services bus is further adapted to route the second request message from the first centralized service to a second one of the centralized services for processing and to route a response message from the second centralized service to the first centralized service.

2. The system of claim 1 wherein the at least two centralized services include a centralized service adapted to convert metadata between different schema associated with different ones of the media services and a canonical schema.

3. The system of claim 1 wherein the at least two centralized services include a metadata search service adapted to perform a global search of metadata associated with media assets maintained by any of the media services.

4. The system of claim 3 wherein the metadata search service includes a centralized index of the metadata and wherein the metadata search service is further configured to perform the global search using the centralized index.

5. The system of claim 4 wherein the metadata search service is further configured to update the centralized index in response to a metadata publication message received from one of the local computer systems via the interoperable media services bus.

6. The system of claim 1 wherein the at least two centralized services include a service adapted to assign globally unique asset identifiers to media assets maintained by the plurality of media services.

7. The system of claim 1 wherein the nomenclature service includes an index of canonical terms, each canonical term being associated with one or more alternative terms or definitional terms.

8. The system of claim 7 wherein the nomenclature service is further configured to respond to a lookup message received via the interoperable media services bus by locating, in the index of canonical terms, a canonical term corresponding to a character string included in the lookup message.

9. The system of claim 7 wherein the nomenclature service is further configured to respond to a lookup message received via the interoperable media services bus by locating, in the index of canonical terms, a first canonical term corresponding to a character string included in the lookup message as well as one or more other canonical terms related to the first canonical term.

10. The system of claim 1 wherein the at least two centralized services include an entity registry service that defines and validates access rights for entities authorized to access any one or more of the media services.

11. The system of claim 10 wherein the authorized entities include users and automated processes.

12. The system of claim 1 wherein the at least two centralized services include an accounting service adapted to track charges incurred during use of the interoperable media services bus or the media services.

13. The system of claim 1 wherein the at least two centralized services include one or more services selected from a group consisting of:
 a digital rights management wrapping service adapted to apply digital rights management information to a media asset;
 a watermarking service adapted to apply watermarking information to a media asset; and
 a rights management service adapted to apply access rights information to media assets or metadata associated with a media asset.

14. The system of claim 1 wherein the at least two centralized services include one or more services selected from a group consisting of:
 a rendering service adapted to create a media asset from input data;
 an editing service adapted to modify a media asset;
 an encoding service adapted to encode a media asset; and
 a transcoding service adapted to transcode a media asset.

15. The system of claim 1 wherein the media services include a digital asset management service that is not a centralized service.

16. The system of claim 1 wherein the media services include a media asset storage service that is not a centralized service.

17. A method for interoperating a plurality of media services, the method comprising:
 for each one of a plurality of media services, defining an application program interface (API) that translates messages between a local format recognized by the one of the plurality of media services and a standard format recognized by an interoperable media services bus;
 for each of at least two centralized services, defining an interface adapted to receive request messages from the interoperable media services bus and to return response messages to the interoperable media services bus, wherein the at least two centralized services include a nomenclature service adapted to define and enforce standard nomenclature across the plurality of media services;
 sending a first request message from a requesting one of the media services to the interoperable media services bus, the first request message requesting a service that is performable by the first centralized service, wherein the sending includes using the API of the requesting media service to translate the request message from the local format recognized by the requesting media service to the standard format;
 routing the first request message to the first centralized service, wherein the routing is performed by the interoperable media services bus transparently to the requesting media service;
 operating the first centralized service to generate a second request message related to the first request message, the second request message requesting a service that is performable by the nomenclature service;
 routing the second request message to the nomenclature service, wherein the routing is performed by the interoperable media services bus;
 operating the nomenclature service to generate a first response message responsive to the second request message;
 routing the first response message to the first centralized service, wherein the routing is performed by the interoperable media services bus;
 generating, by the first centralized service, a second response message based in part on the first response message;
 sending the second response message to the interoperable media services bus; and
 routing, by the interoperable media services bus, the second response message to the requesting media service.

18. A method for interoperating a plurality of media services, the method comprising:
 for each one of a plurality of media services, defining an application program interface (API) that translates messages between a local format recognized by the one of the plurality of media services and a standard format recognized by an interoperable media services bus;
 for at least a first centralized service, defining an interface adapted to receive request messages from the interoperable media services bus and to return response messages to the interoperable media services bus;
 sending a first request message from a requesting one of the media services to the interoperable media services bus, the first request message requesting a service that is performable by the first centralized service, wherein the sending includes using the API of the requesting media service to translate the request message from the local format recognized by the requesting media service to the standard format;
 routing the first request message to the first centralized service, wherein the routing is performed by the interoperable media services bus transparently to the requesting media service;
 operating the first centralized service to perform the requested service and to generate a first response message responsive to the first request message;
 sending the first response message to the interoperable media services bus; and routing, by the interoperable media services bus, the first response message to the requesting media service,
wherein the first centralized service is a service selected from a group consisting of:
  a metadata search service adapted to perform a global search of metadata associated with media assets maintained by any of the media services;
  a nomenclature service adapted to define and enforce standard nomenclature across the plurality of media services; and
  a metadata mapping service adapted to maintain a canonical metadata schema for representing metadata associated with a media asset and to map between a plurality of local schemas associated with different ones of the plurality of media services and the canonical schema.

* * * * *